US007526629B2

(12) United States Patent
Saida

(10) Patent No.: US 7,526,629 B2
(45) Date of Patent: Apr. 28, 2009

(54) VECTOR PROCESSING APPARATUS WITH OVERTAKING FUNCTION TO CHANGE INSTRUCTION EXECUTION ORDER

(75) Inventor: Yasumasa Saida, Tokyo (JP)

(73) Assignee: NEC Corporation, Tokyo (JP)

( * ) Notice: Subject to any disclaimer, the term of this patent is extended or adjusted under 35 U.S.C. 154(b) by 191 days.

(21) Appl. No.: 11/062,561

(22) Filed: Feb. 23, 2005

(65) Prior Publication Data

US 2005/0188178 A1 Aug. 25, 2005

(30) Foreign Application Priority Data

Feb. 23, 2004 (JP) ............................... 2004-047066

(51) Int. Cl.
*G06F 15/00* (2006.01)
(52) U.S. Cl. ....................................................... 712/2
(58) Field of Classification Search ..................... 712/2
See application file for complete search history.

(56) References Cited

U.S. PATENT DOCUMENTS

| 4,722,049 | A | * | 1/1988 | Lahti .............................. 712/3 |
| 5,941,980 | A | * | 8/1999 | Shang et al. ................ 712/204 |
| 2002/0087849 | A1 | * | 7/2002 | Arimilli et al. .............. 712/235 |

FOREIGN PATENT DOCUMENTS

| EP | 1035479 A2 | 9/2000 |
| JP | 2-253470 A | 10/1990 |
| JP | H04-369773 A | 12/1992 |
| JP | H08-12661 A | 2/1996 |
| JP | H09-231203 A | 9/1997 |
| JP | 10-269199 A | 10/1998 |
| JP | 2001-195389 A | 7/2001 |
| JP | 2002-32361 A | 1/2002 |
| JP | 2002-297566 A | 10/2002 |
| JP | 2002-366538 A | 12/2002 |
| WO | WO 03/001383 A2 | 1/2003 |

* cited by examiner

*Primary Examiner*—Eddie P Chan
*Assistant Examiner*—John Lindlof
(74) *Attorney, Agent, or Firm*—Sughrue Mion, PLLC

(57) ABSTRACT

A vector processing apparatus includes a main memory, an instruction issuing section which issues instructions, an overtaking control circuit which outputs the instructions received from the instruction issuing section to an instruction executing section in an order based on whether each of a first and second instructions belongs to a first specific instruction group, whether each of the first and second instructions belongs to a second specific instruction group in the first specific instruction group, whether a fourth instruction belongs to a fourth specific instruction group, whether a third instruction belongs to a third specific instruction group, and whether an address area of the main memory relating to the third instruction and an address area of the main memory relating to each of the first and second instructions do not overlap, and the instruction executing section executes the instructions received from the overtaking control circuit.

17 Claims, 12 Drawing Sheets

|  | VECTOR LOAD INSTRUCTION | VECTOR GATHER INSTRUCTION | VECTOR STORE INSTRUCTION | VECTOR SCATTER INSTRUCTION |
|---|---|---|---|---|
| VECTOR LOAD INSTRUCTION |  | OVERTAKING IS PERMITTED IN COMBINATION WITH VECTOR GATHERING INSTRUCTION | OVERTAKING IS PERMITTED IN COMBINATION WITH VECTOR STORE INSTRUCTION WHEN ADDRESS AREAS DO NOT OVERLAP | OVERTAKING IS IMPOSSIBLE |
| VECTOR GATHER INSTRUCTION | OVERTAKING IS PERMITTED IN COMBINATION WITH VECTOR GATHERING INSTRUCTION |  | OVERTAKING IS IMPOSSIBLE | OVERTAKING IS IMPOSSIBLE |
| VECTOR STORE INSTRUCTION | OVERTAKING IS PERMITTED IN COMBINATION WITH VECTOR STORE INSTRUCTION WHEN ADDRESS AREAS DO NOT OVERLAP | OVERTAKING IS IMPOSSIBLE |  | OVERTAKING IS IMPOSSIBLE |
| VECTOR SCATTER INSTRUCTION | OVERTAKING IS IMPOSSIBLE | OVERTAKING IS IMPOSSIBLE | OVERTAKING IS IMPOSSIBLE |  |

Fig. 1

| | NECESSARY DATA & PREPARATION TIME | | |
|---|---|---|---|
| | ADDRESS | RESTORE ADDRESS | STORE DATA |
| | SHORT | LONG | LONG |
| VECTOR LOAD INSTRUCTION | O | | |
| VECTOR GATHER INSTRUCTION | O | | |
| VECTOR STORE INSTRUCTION | | O | O |
| VECTOR SCATTER INSTRUCTION | | O | O |

Fig. 2

| | VECTOR LOAD INSTRUCTION | VECTOR GATHER INSTRUCTION | VECTOR STORE INSTRUCTION | VECTOR SCATTER INSTRUCTION |
|---|---|---|---|---|
| VECTOR LOAD INSTRUCTION | | OVERTAKING IS PERMITTED IN COMBINATION WITH VECTOR GATHERING INSTRUCTION | OVERTAKING IS PERMITTED IN COMBINATION WITH VECTOR STORE INSTRUCTION WHEN ADDRESS AREAS DO NOT OVERLAP | OVERTAKING IS IMPOSSIBLE |
| VECTOR GATHER INSTRUCTION | OVERTAKING IS PERMITTED IN COMBINATION WITH VECTOR GATHERING INSTRUCTION | | OVERTAKING IS IMPOSSIBLE | OVERTAKING IS IMPOSSIBLE |
| VECTOR STORE INSTRUCTION | OVERTAKING IS PERMITTED IN COMBINATION WITH VECTOR STORE INSTRUCTION WHEN ADDRESS AREAS DO NOT OVERLAP | OVERTAKING IS IMPOSSIBLE | | OVERTAKING IS IMPOSSIBLE |
| VECTOR SCATTER INSTRUCTION | OVERTAKING IS IMPOSSIBLE | OVERTAKING IS IMPOSSIBLE | OVERTAKING IS IMPOSSIBLE | |

VECTOR PROCESSING APPARATUS WITH OVERTAKING FUNCTION TO CHANGE INSTRUCTION EXECUTION ORDER

BACKGROUND OF THE INVENTION

1. Field of the Invention

The present invention relates to a vector processing apparatus for carrying out load/store by in response to a vector instruction, and an overtaking control circuit.

2. Description of the Related Art

A vector processing apparatus carries out a vector instruction to access a main memory to carry out a memory access for load/store. Various techniques for this memory access faster are proposed.

A vector processing apparatus is disclosed in Japanese Laid Open Patent Application (JP-P2002-366538A: first conventional example). In the vector processing apparatus, a control is carried out that a precedent store-based instruction is overtaken by a following load-based instruction, in order to make the memory access faster. The vector processing apparatus contains a first overtaking determining section and a second overtaking determining section. The first overtaking determining section determines the overlap between an address region accessed by the preceding store-based instruction and an address region accessed by the following load-based instruction when instructions are generated from a software program, and sets an overtaking bit, and refers to the overtaking bit to carry out the overtaking control of the following load-based instruction. The second overtaking determining section calculates the address region accessed by the store-based instruction and the address region accessed by the load-based instruction, and refers to the overlap between the calculated address regions to carry out the overtaking control.

A vector store instruction overtaking control apparatus is disclosed in Japanese Laid Open Patent Application (JP-A-Heisei 9-231203: second conventional example). In the conventional vector store instruction overtaking control apparatus, in order to make the memory access faster, a following load-based instruction is carried out to carry out the memory access early, if an access region accessed by the following load-based instruction does not overlap with a region of a preceding vector store instruction. The conventional vector store instruction overtaking control apparatus contains a request receiving section, at least one vector store instruction holding section, a following instruction holding section, an access region calculation pipeline section, a region holding section, an overtaking determining section, an instruction pipeline holding section and a selecting section. The request receiving section receives a memory request issued from an instruction issuing section. The vector store instruction holding section holds only a vector store instruction among the instructions received by the request receiving section. The following instruction holding section holds the following instructions except the vector store instruction. The access region calculation pipeline section carries out a region calculation of each of the address regions accessed by the vector store instruction held in the vector store instruction holding section and accessed by the load-based instructions held in the following instruction holding section in a pipeline manner. The region holding section holds the address regions which are calculated by the access region calculation pipeline section for the following load-based instructions and the vector store instruction. The overtaking check determining section detects in the pipeline manner the fact that the vector store instruction can overtake the following load-based instructions, from the address regions held in the region holding section. The instruction pipeline holding section holds the instructions during the region calculation and overtaking check in the pipeline manner. The selecting section selects any instruction to access the memory, from any of the vector store instruction holding section, instruction pipeline holding section and request receiving section, in accordance with the result of the overtaking check.

An instruction sequence control system is disclosed in Japanese Laid Open Patent Application (JP-A-Heisei 8-12661: third conventional example). In the conventional instruction sequence control system, in order to make the memory access faster, a control is carried out that a preceding vector store instruction is overtaken by a following vector load instruction. The conventional instruction sequence control system contains a vector operating unit and a main memory processing unit. The vector operating unit is configured from one or more pipelined operating units, a plurality of vector registers, and a network for connecting the operating units and the vector registers. The main memory operating unit carries out a load/store in units of vector instructions between it and the vector register of a main memory. The conventional instruction sequence control system contains a first section, a second section and a third section. The first section holds a group of instructions to be inputted to the vector operating unit and the main memory processing unit. The second section holds the statuses of the vector register, operating unit and main memory that are used by the instruction under execution. The third section determines the instructions to be inputted to the vector operating unit and main memory processing unit, from the group of instructions held by the first section in accordance with the statuses of various resources held by the second section irrespectively of an instruction input order specified by a program. The third section supplies the vector load instruction to the vector operating unit and main memory processing unit prior to the vector store instruction when a distance between vector elements specified by the vector store instruction is equal to a distance between vector elements specified by the vector load instruction, when a store start point address specified by the vector store instruction is not equal to a load start point address specified by the vector load instruction and if a difference between the store start point address specified by the vector store instruction and the load start point address specified by the vector load instruction is smaller than the distance between the vector elements specified by the vector load instruction.

A vector gather instruction overtaking circuit is disclosed in Japanese Laid Open Patent Application (JP-P2002-297566A: fourth conventional example). In the conventional vector gather instruction overtaking circuit, in order to make the memory access faster, a control is carried out that a preceding vector gather instruction is overtaken by a following vector load instruction. The conventional vector gather instruction overtaking circuit contains a scalar unit, a vector unit and a memory access request generating section. The conventional vector gather instruction overtaking circuit contains an instruction buffer, a first flip-flop group, a first decoder, a second flip-flop group, a second decoder, a third flip-flop group, a vector gather instruction issuing determining section, a selection signal generating section and a selecting section. In the instruction buffer, a vector gather instruction and a following instruction are waited until an address of the vector gather instruction in the vector unit is aligned. The first group of flip-flops holds an instruction effective flag indicating validity/invalidity of an instruction stored in each of stages of the instruction buffer. The first decoder determines whether or not an instruction inputted from the scalar unit is the vector gather instruction. The second group of flip-flops holds a vector gather instruction flag indicating whether or not the instruction stored in each stage of the instruction buffer is the vector gather instruction, in accordance with an output signal of the first decoder. The second decoder determines whether or not the instruction inputted from the scalar unit is a load instruction. The third group of flip-flops holds a load instruction flag indicating whether or not the instruction stored in each stage of the instruction buffer is the load instruction, in accordance with an output signal of the second decoder. The vector gather instruction issuing determining section counts a vector gather instruction issue permission from the vector unit and determines an issue possible state of the vector gather instruction stored in the instruction buffer. The selection signal generating section determines the possibility or impossibility of the overtaking of the preceding vector gather instruction by the following load instruction flag, in accordance with the output signal of the vector gather instruction issuing determining section, the instruction validity flag, the vector gather instruction flag and the load instruction flag, and generates a selection signal based on the possibility or impossibility of the overtaking. The selecting section selects the instruction to be sent to the memory access request generating section from the inputted instructions and the instructions stored in the instruction buffer in accordance with the selection signal from the selection signal generating section.

A vector gather/scatter instruction execution order control circuit is described in Japanese Laid Open Patent Application (JP-A 2002-32361, fifth conventional example). This conventional vector gather/scatter instruction execution order control circuit includes a processing unit and an overtaking control circuit, in order to make the memory access faster. Fields for specifying registers that stores a head address and an end address of a memory area to be accessed are provided in the instruction portion of each of the vector gather instruction and the vector scatter instruction. In the overtaking control circuit, similarly to the vector load instruction and the vector store instruction, it is possible to know the memory area to be accessed based on the registers specified by the instruction even in the vector gather instruction and the vector scatter instruction. Therefore, the vector gather instruction and the vector scatter instruction are handled as targets for the overtaking control.

Also, an information processing apparatus is disclosed in Japanese Laid Open Patent application (JP-A-Heisei 4-369773). In this conventional example, a data path is provided between a main memory unit and a vector operation processing unit. A data path is provided between the main memory unit and a scholar operation processing unit. An instruction circuit issues a load/store instruction of vector data/scholar data to the vector operation processing unit or the scholar operation processing unit in accordance with a program command. The vector operation processing unit contains a vector buffer memory circuit to store a copy of data of the main memory unit, an address storage circuit in which an address of the main memory unit corresponding to the data stored in the vector buffer memory circuit is registered, and an address control circuit to newly register the address or invalidate the registered address. The scholar operation processing unit contains a scholar buffer memory circuit to store a copy of data of the main memory unit, a tag storage circuit in which a block address of the main memory unit corresponding to the data stored in the scholar buffer memory circuit is registered, and a tag control circuit to newly register the block address or invalidate the registered block address. The scholar operation processing unit further contains a tag registration invalidation instructing circuit to check whether a store address of each of a plurality of vector elements generated in accompaniment with the vector data store instruction is registered in the tag storage circuit, to output an invalidation instruction to the tag control circuit when the store address is registered on the tag storage circuit, and a vector store address calculating section to output a store start address and a store end address as an address region on the main memory unit corresponding to the vector data store instruction. The scholar operation processing unit further contains a region detecting circuit to check whether a scholar data load address of a scholar data load instruction is in the address region indicated by the vector store address calculating section when the following scholar load instruction is received from the instruction circuit before the tag registration invalidation instructing circuit completes the operation of the invalidation instruction in response to the vector data store instruction. The scholar operation processing unit further contains a cache control circuit to carry out a control to load the scholar data from the vector buffer memory circuit if the address is registered which is given to the address storage circuit by a scholar data load instruction when a in-region detection signal is outputted from the region detecting circuit in response to the scholar data load instruction from the instruction circuit, and to load the scholar data from the main memory unit if the address corresponding to the scholar data load instruction is registered on the address storage circuit.

SUMMARY OF THE INVENTION

An object of the present invention is to provide a vector processing apparatus including an overtaking control circuit for making a memory access faster.

In an aspect of the present invention, a vector processing apparatus includes a main memory, an instruction issuing section, an overtaking control circuit, and an instruction executing section. The instruction issuing section sequentially issues instructions, which contain instructions associated with access to the main memory. The overtaking control circuit outputs the instructions received from the instruction issuing section to the instruction executing section in an order determined based on whether there are instructions belonging to a first specific instruction group before a last instruction, whether there are instructions belonging to a second specific instruction group in the first specific instruction group before the last instruction, whether there are instructions belonging to a third specific instruction group before the last instruction, whether the last instruction belongs to a fourth specific instruction group, and whether an address area of the main memory relating to the last instruction and an address area of the main memory relating to each of the instructions belonging to the second specific instruction group do not overlap at all. The instruction executing section executes the instructions received from the overtaking control circuit in an order of reception.

Here, the overtaking control circuit may include first to fourth decoders. The first decoder detects ones of the received instructions, which belong to the first specific instruction group but does not belong to the second specific instruction group. The second decoder detects ones of the received instructions, which belong to the second specific instruction group. The third decoder detects ones of the received instruction, which belong to the third specific instruction group. The fourth decoder detects ones of the received instructions which belong to the fourth specific instruction group. In this case, the overtaking control circuit may further include an order holding section and an overtaking determining section. The order holding section holds an order of reception of the received instructions. The overtaking determining section determines whether an address area of the main memory relating to the instruction decoded by the fourth decoder and an address area of the main memory relating to the instruction decoded by the second decoder do not overlap at all.

In this case, when first and second instructions are received in this order, the third decoder does not detect any third instruction belonging to the third specific instruction group from the received instructions, and the fourth decoder detects the last instruction as a fourth instruction after the second instruction, the overtaking control circuit outputs the fourth instruction before the first or second instruction, depending on whether each of the first and second instructions belongs to the first specific instruction group, whether each of the first and second instructions belongs to the second specific instruction group, and whether the address area of the main memory relating to the fourth instruction and the address area of the main memory relating to each of the first and second instructions do not overlap at all.

In this case, the overtaking control circuit outputs the fourth instruction before the first and second instructions while keeping the order of the received instructions other than the fourth instruction, when the first decoder detects the first and second instructions. Also, the overtaking control circuit outputs the fourth instruction before the first and second instructions while keeping the order of the received instructions other than the fourth instruction, when the first decoder detects the first instruction, and the second decoder detects the second instruction, and when the address area of the main memory relating to the fourth instruction and the address area of the main memory relating to the second instruction do not overlap at all. The overtaking control circuit outputs the fourth instruction after the second instruction while keeping the order of the received instructions other than the fourth instruction, when the first decoder detects the first instruction, and the second decoder detects the second instruction, and when the address area of the main memory relating to the fourth instruction and the address area of the main memory relating to the second instruction overlap partially or entirely.

Also, the overtaking control circuit outputs the fourth instruction before the first and second instructions while keeping the order of the received instructions other than the fourth instruction, when the first decoder detects the second instruction, and the second decoder detects the first instruction, and when the address area of the main memory relating to the fourth instruction and the address area of the main memory relating to the first instruction do not overlap at all. Also, the overtaking control circuit outputs the fourth instruction after the first instruction and before the second instruction while keeping the order of the received instructions other than the fourth instruction, when the first decoder detects the second instruction, and the second decoder detects the first instruction, and when the address area of the main memory relating to the fourth instruction and an address area of the main memory relating to the first instruction overlap partially or entirely.

Also, when first and second instructions are received in this order, the third decoder detects a third instruction from the received instructions after the first instruction and before the second instruction, the fourth decoder detects the last instruction as a fourth instruction from the received instructions after the second instruction, the overtaking control circuit outputs the fourth instruction after the third instruction, depending on whether the second instruction belongs to the first specific instruction group, whether the second instruction belongs to the second specific instruction group, and whether the address area of the main memory relating to the fourth instruction and the address area of the rain memory relating to the second instruction do not overlap at all.

In this case, the overtaking control circuit outputs the fourth instruction after the third instruction and before the second instruction while keeping the order of the received instructions other than the fourth instruction, when the first decoder detects the second instruction.

Also, the overtaking control circuit outputs the fourth instruction after the third instruction and before the second instruction while keeping the order of the received instructions other than the fourth instruction, when the second decoder detects the second instruction, and when the address area of the main memory relating to the fourth instruction and the address area of the main memory relating to the second instruction do not overlap at all. Also, the overtaking control circuit outputs the fourth instruction after the second instruction while keeping the order of the received instructions other than the fourth instruction, when the second decoder detects the second instruction, and when the address area of the main memory relating to the fourth instruction and the address area of the main memory relating to the second instruction overlap partially or entirely.

Also, when first and second instructions are received in this order, the third decoder detects a third instruction from the received instructions before the first instruction, and the fourth decoder detects the last instruction as a fourth instruction from the received instructions, the overtaking control circuit outputs the fourth instruction after the third instruction and before the first or second instruction, depending on whether the first decoder detects each of the first and second instructions, whether the second decoder detects each of the first and second instructions, and whether the address area of the main memory relating to the fourth instruction and the address area of the main memory relating to each of the first and second instructions do not overlap at all.

In this case, the overtaking control circuit outputs the fourth instruction after the third instruction and before the first instruction while keeping the order of the received instructions other than the fourth instruction, when the first decoder detects the first and second instructions.

Also, the overtaking control circuit outputs the fourth instruction after the third instruction and before the first and second instructions while keeping the order of the received instructions other than the fourth instruction, when the first decoder detects the first instruction, and the second decoder detects the second instruction, and when the address area of the main memory relating to the fourth instruction and an address area of the main memory relating to the second instruction do not overlap at all. Also, the overtaking control circuit outputs the fourth instruction after the second instruction while keeping the order of the received instructions other than the fourth instruction, when the first decoder detects the first instruction, and the second decoder detects the second instruction, and when the address area of the main memory relating to the fourth instruction and the address area of the main memory relating to the second instruction overlap partially or entirely.

Also, the overtaking control circuit outputs the fourth instruction after the third instruction and before the first instruction while keeping the order of the received instructions other than the fourth instruction, when the second decoder detects the first instruction, and the first decoder detects the second instruction, and when the address area of the main memory relating to the fourth instruction and the address area of the main memory relating to the first instruction do not overlap at all. Also, the overtaking control circuit outputs the fourth instruction after the first instruction and before the second instruction while keeping the order of the received instructions other than the fourth instruction, when the second decoder detects the first instruction, and the first decoder detects the second instruction, and when the address area of the main memory relating to the fourth instruction and an address area of the main memory relating to the first instruction overlap partially or entirely.

In the above, the first specific instruction group contains a vector gather instruction and a vector store instruction, the second specific instruction group contains the vector store instruction, the third specific instruction group contains a vector scatter instruction, and the fourth specific instruction group contains a vector load instruction. In this case, the fourth specific instruction group contains a scalar load instruction and a scalar store instruction.

BRIEF DESCRIPTION OF THE DRAWINGS

FIG. 1 a diagram showing a comparison result between data required to execute a vector instruction used in an instruction executing process and a preparation time required to prepare the execution of the instruction in a vector processing apparatus of the present invention;

FIG. 2 is a diagram showing combinations of vector instructions to which an overtaking control of a preceding vector instruction by a following vector instruction can be carried out, in the instruction executing process in the vector processing apparatus of the present invention and its effect;

FIGS. 9 to 9O are timing charts showing an operation of the vector processing apparatus in which an overtaking control process is not employed;

DESCRIPTION OF THE PREFERRED EMBODIMENTS

Figure 3:
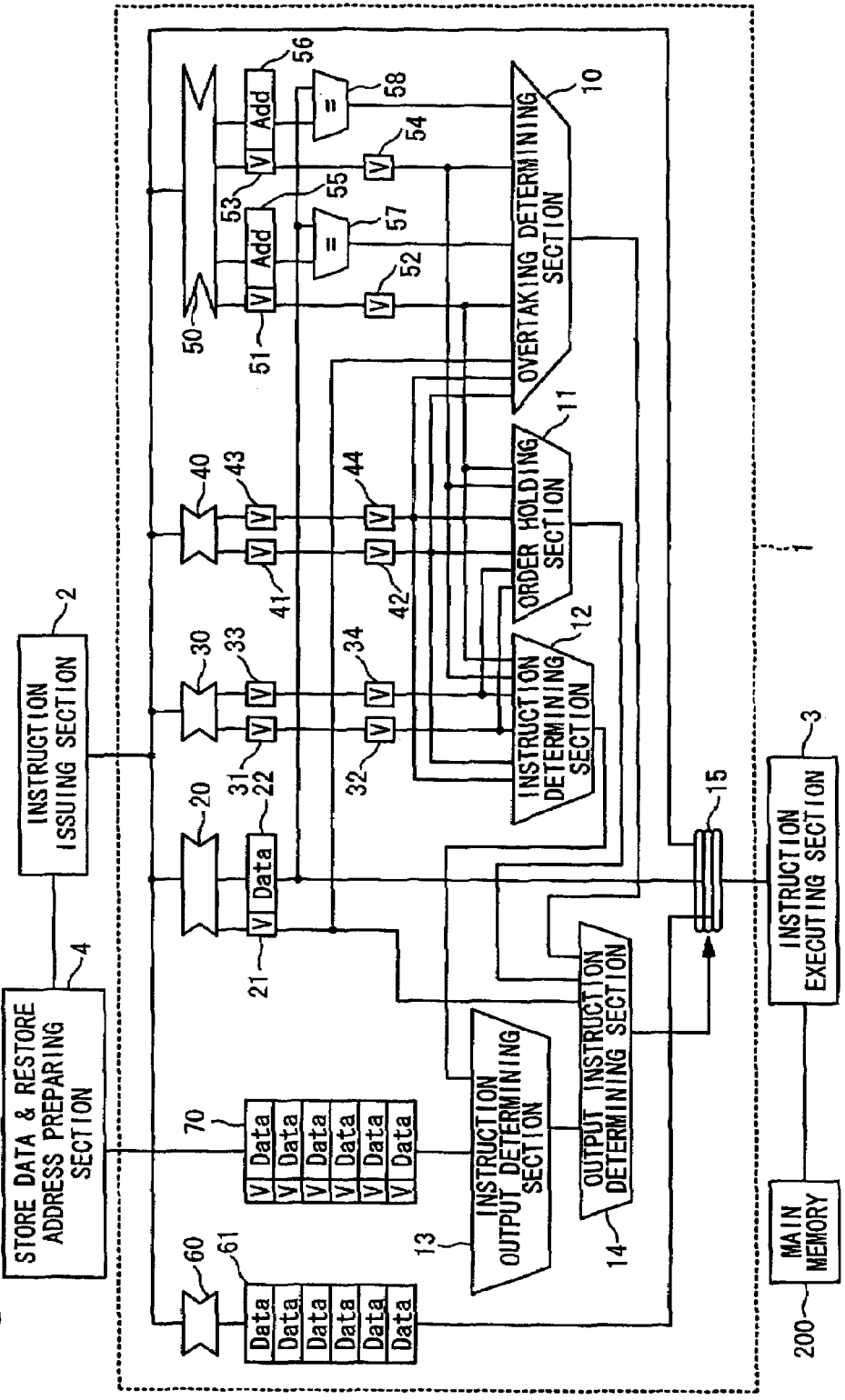
FIG. 3 a diagram showing a configuration of a vector processing apparatus of the present invention.

Hereinafter, a vector processing apparatus according to the present invention will be described in detail with reference to the attached drawings.

The vector processing apparatus of the present invention accesses a main memory in response to a vector instruction to carries out a memory access for load/store. In the vector processing apparatus of the present invention, the memory access is made faster than that of a conventional vector processing apparatus. At first, the vector instruction used in the memory access in the vector processing apparatus of the present invention will be described.

As the vector instructions, there are instructions such as a vector load instruction, a vector gather instruction, a vector store instruction and a vector scatter instruction. FIG. 1 shows a comparison result between data required to execute the vector instructions (vector load instruction, vector gather instruction, vector store instruction and vector scatter instruction) used in the memory access in the vector processing apparatus of the present invention, and a preparation time required to prepare the execution of each instruction (a necessary time until the execution after the issue of the instruction). A first instruction group contains a second instruction group. The first instruction group contains a vector gather instruction and a vector store instruction, and the second instruction group contains the vector store instruction. A third instruction group contains a vector scatter instruction, and a fourth instruction group contains a vector load instruction.

The data required to execute the vector instructions (vector load instruction, vector gather instruction, vector store instruction and vector scatter instruction) are an address, a list address and a store data. In this case, a time for the preparation of the address is short, as compared with times for the preparation of list address and the store data. The data necessary for the vector load instruction is an address, and the preparation time in the vector load instruction is short as compared with the preparation times in the other instructions.

The data necessary for the vector store instruction are an address and store data, and the preparation time in the vector store instruction is long as compared with the preparation times in the other instructions.

The data necessary for the vector gather instruction is a list address, and the preparation time in the vector gather instruction is long as compared with the preparation times in the other instructions.

The data necessary for the vector scatter instruction are a list address and store data, and the preparation time in the vector scatter instruction is long as compared with the preparation times in the other instructions.

The vector gather instruction is a vector load instruction using an indirect address (list vector). In other words, the vector gather instruction is the vector instruction for using a content of a vector register as a memory access for a load operation.

The vector scatter instruction is a vector store instruction using an indirect address (list vector). In other words, the vector scatter instruction is the vector instruction for using the content of the vector register as a memory access for a store operation.

As seen from the above description, when a vector instruction, e.g., a vector gather instruction with a long preparation time is issued as a preceding instruction, and then a vector load instruction with a short preparation time is issued as a following instruction, a waiting time for the execution preparation can be reduced if the vector load instruction can overtake the vector gather instruction. Thus, it is possible to greatly improve a processing time necessary for the memory access.

FIG. 2 is a diagram showing combinations of vector instructions in which the overtaking operation is permitted when each of the vector instructions used for memory access such as the vector load instruction, vector gather instruction, vector store instruction and vector scatter instruction is used as a preceding instruction or a following instruction. FIG. 2 shows also the effect for each combination. The combinations in which the overtaking operation is permitted are the following four cases from a case 1 to a case 4.

Case 1: the following vector load instruction overtakes the preceding vector gather instruction.
Case 2: the following vector load instruction overtakes the preceding vector store instruction.
Case 3: the following vector gather instruction overtakes the preceding vector load instruction.
Case 4: the following vector store instruction overtakes the preceding vector load instruction.

In the combinations of the case 1 and the case 2 of these cases 1 to 4, it would be possible to reduce the processing time necessary for the memory access from the viewpoint of the preparation time, as mentioned above. On the other hand, in the combinations of the case 3 and the case 4, the effect of the overtaking operation would be small from the viewpoint of the preparation time, as mentioned above. Consequently, the combinations of the instructions in which the reduction in the processing time necessary for the memory access is possible are the combinations of the case 1 and the case 2. The performance can be improved by attaining the overtaking control so that the vector load instruction overtakes the vector gather instruction or the vector store instruction. In this way, in the vector processing apparatus of the present invention, the overtaking control is carried out in such a manner that the vector load instruction overtakes the vector gather instruction or the vector store instruction in the memory access.

Next, the memory access in the vector processing apparatus of the present invention will be described below. In the memory access, whether the overtaking operation is possible is detected. When the overtaking operation is impossible, the overtaking is not carried out. The conditions that the overtaking operation is impossible are the following two conditions 1 and 2. The overtaking operation is carried out only when both of the two conditions are not met.

Condition 1: a vector store instruction exists as a preceding instruction, and at least a portion of an address region accessed by the vector load instruction and at least a portion of an address region accessed by the vector store instruction overlap or coincide with each other.
Condition 2: a vector scatter instruction exists as a preceding instruction.

As for the condition 1, the vector store instruction is a store instruction. Thus, when data of the address region accessed based on the vector store instruction is loaded based on the vector load instruction, there would be a case that the result when an order of the vector load instruction and vector store instruction is not changed is different from a result when the order is changed. Therefore, in order to permit the overtaking operation of the vector store instruction by the vector load instruction, it is necessary to check whether or not the address region accessed by the vector load instruction and the address region accessed by the vector store instruction overlap. The vector load instruction can overtake the vector store instruction, only when these address regions do not overlap.

As for the condition 2, the vector scatter instruction is a store instruction. Thus, when the data of the region accessed based on the vector scatter instruction is loaded based on the vector load instruction, there would be a case that a result when an order of the vector load instruction and the vector scatter instruction is changed is different a result when the order is not changed. Since the vector scatter instruction is an access using a list address, it is difficult to specify an address region accessed based on the vector scatter instruction. For this reason, in the memory access in the vector processing apparatus of the present invention, the overtaking operation is not carried out if the vector scatter instruction exists as the preceding instruction.

It should be noted that if the vector gather instruction exists as the preceding instruction, both of the vector load instruction and the vector gather instruction are the load instructions. For this reason, the data on the memory is never rewritten. Thus, even if the order of the vector load instruction and vector gather instruction is changed, the data to be loaded is not changed, which permits the vector load instruction to overtake the vector gather instruction.

FIG. 3 shows the configuration of the vector processing apparatus of the present invention. The vector processing apparatus of the present invention is a computer, and includes an overtaking control circuit 1, an instruction issuing section 2, an instruction executing section 3 and a store data & address data preparing section 4. The overtaking control circuit 1 is connected to the instruction issuing section 2, the instruction executing section 3 and the store data & address data preparing section 4.

The store data & address data preparing section 4 is connected to the instruction issuing section 2. The instruction executing section 3 is connected to a main memory 200.

The overtaking control circuit 1, the instruction issuing section 2, the instruction executing section 3 and the store data & address data preparing section 4 operate in synchronism with an external clock (system clock signal). The instruction issuing section 2 outputs the vector instruction (vector load instruction, vector gather instruction, vector store instruction or vector scatter instruction) as an input instruction to the overtaking control circuit 1 in synchronism with the system clock signal. The overtaking control circuit 1 outputs an output instruction in response to the input instruction. The instruction executing section 3 accesses the main memory 200 in response to the output instruction. The output instruction will be described later in detail.

When outputting the vector gather instruction to the overtaking control circuit 1, the instruction issuing section 2 outputs a vector gather instruction transfer data to the store data & address data preparing section 4 to indicate that the vector gather instruction is outputted. The store data & address data preparing section 4 outputs a list address for the vector gather instruction to the overtaking control circuit 1 in response to the vector gather instruction transfer data from the instruction issuing section 2 in synchronism with the system clock signal, after the elapse of a predetermined time.

When outputting the vector store instruction to the overtaking control circuit 1, the instruction issuing section 2 outputs a vector store instruction transfer data to the store data & address data preparing section 4 to indicate that the vector store instruction is outputted. The store data & address data preparing section 4 outputs store data for the vector store instruction to the overtaking control circuit 1 in response to the vector store instruction transfer data from the instruction issuing section 2 in synchronism with the system clock signal, after the elapse of a predetermined time.

When outputting the vector scatter instruction to the overtaking control circuit 1, the instruction issuing section 2 outputs a vector scatter instruction transfer data to the store data & address data preparing section 4 to indicate that the vector scatter instruction is outputted. The store data & address data preparing section 4 outputs a list address and store data for the vector scatter instruction to the overtaking control circuit 1 in response to the vector scatter instruction transfer data from the instruction issuing section 2 in synchronism with the system clock signal, after the elapse of a predetermined time.

The timing when the instruction issuing section 2 outputs the vector instruction to the overtaking control circuit 1 is determined based on the design of the vector processing apparatus of the present invention. Also, the timing when the store data & address data preparing section 4 outputs the list address and the store data to the overtaking control circuit 1 is determined based on the vector instruction transfer data and the design of the vector processing apparatus of the present invention.

The overtaking control circuit 1 further includes a vector load instruction decoder 20, a vector load instruction valid flag storage section 21 and a vector load instruction register 22. The vector load instruction decoder 20 is connected to the instruction issuing section 2. The vector load instruction valid flag storage section 21 and the vector load instruction register 22 are connected to the vector load instruction decoder 20.

The vector load instruction decoder 20 decodes the vector instruction sent from the instruction issuing section 2 to detect the vector load instruction. If the vector instruction is the vector load instruction, a vector load instruction valid flag is set in the vector load instruction valid flag storage section 21, and the vector load instruction is set as data in the vector load instruction register 22 at the same time.

The overtaking control circuit 1 further includes a vector gather/store/scatter instruction decoder 60 and a vector gather/store/scatter instruction storage section 61. The vector gather/store/scatter instruction decoder 60 is connected to the instruction issuing section 2. The vector gather/store/scatter instruction storage section 61 is connected to the vector gather/store/scatter instruction decoder 60.

The vector gather/store/scatter instruction decoder 60 decodes the vector instruction sent from the instruction issuing section 2 to detect the vector gather instruction, vector store instruction or vector scatter instruction. If the vector instruction is the vector gather instruction, vector store instruction or vector scatter instruction, the vector gather/store/scatter instruction decoder 60 defines the instruction as data and stores in the vector gather/store/scatter instruction storage section 61. The vector gather/store/scatter instruction storage section 61 outputs the stored instructions in the stored order in accordance with an FIFO control.

The overtaking control circuit 1 further includes a vector gather instruction decoder 30, an upper stage vector gather instruction valid flag storage section and a lower stage vector gather instruction valid flag storage section. Each of the upper stage vector gather instruction valid flag storage section and the lower stage vector gather instruction valid flag storage section is sufficient to be provided one or more. The upper stage vector gather instruction valid flag storage section has upper stage vector gather instruction valid flag storage sections 31 and 33. The lower stage vector gather instruction valid flag storage section has lower stage vector gather instruction valid flag storage sections 32 and 34. The vector gather instruction decoder 30 is connected to the instruction issuing section 2. The upper stage vector gather instruction valid flag storage sections 31 and 33 are connected to the vector gather instruction decoder 30. The lower stage vector gather instruction valid flag storage sections 32 and 34 are connected to the upper stage vector gather instruction valid flag storage sections 31 and 33, respectively.

The vector gather instruction decoder 30 decodes the vector instruction sent from the instruction issuing section 2 to detect the vector gather instruction. If the vector instruction is the vector gather instruction, the vector gather instruction decoder 30 sets a vector gather instruction valid flag (stage 1-#1) in the upper stage vector gather instruction valid flag storage section 31. The vector gather instruction valid flag (stage 1-#1) is sent as a vector gather instruction valid flag (stage 2-#1) to the lower stage vector gather instruction valid flag storage section 32 in synchronism with the system clock signal.

Next, the vector gather instruction decoder 30 sets a vector gather instruction valid flag (stage 1-#2) in the upper stage vector gather instruction valid flag storage section 33, if the vector instruction sent from the instruction issuing section 2 is the vector gather instruction. The vector gather instruction valid flag (stage 1-#2) is sent as the vector gather instruction valid flag (stage 2-#2) to the lower stage vector gather instruction memory 34 in synchronism with the system clock signal.

The vector gather instruction valid flag is used to determine the order of the vector gather instruction and the other instructions and also indicates the existence of the vector gather instruction. The vector gather instruction is stored in the vector gather/store/scatter instruction storage section 61.

The overtaking control circuit 1 further includes a vector scatter instruction decoder 40, an upper stage vector scatter instruction valid flag storage section and a lower stage vector scatter instruction valid flag storage section. Each of the upper stage vector scatter instruction valid flag storage section and the lower stage vector scatter instruction valid flag storage section is sufficient to be provided one or more. The upper stage vector scatter instruction valid flag storage section has upper stage vector scatter instruction valid flag storage sections 41 and 43. The lower stage vector scatter instruction valid flag storage section has lower stage vector scatter instruction valid flag storage sections 42 and 44. The vector scatter instruction decoder 40 is connected to the instruction issuing section 2. The upper stage vector scatter instruction valid flag storage sections 41 and 43 are connected to the vector scatter instruction decoder 40. The lower stage vector scatter instruction valid flag storage sections 42 and 44 are connected to the upper stage vector scatter instruction valid flag storage sections 41 and 43, respectively.

The vector scatter instruction decoder 40 decodes the vector instruction sent from the instruction issuing section 2 to detect the vector scatter instruction. If the vector instruction is the vector scatter instruction, the vector scatter instruction decoder 40 sets a vector scatter instruction valid flag (stage 1-#1) in the upper stage vector scatter instruction valid flag storage section 41. The vector scatter instruction valid flag (stage 1-#1) is sent as a vector scatter instruction valid flag (stage 2-#1) to the lower stage vector scatter instruction valid flag storage section 42 in synchronism with the system clock signal.

Next, the vector scatter instruction decoder 40 sets a vector scatter instruction valid flag (stage 1-#2) in the upper stage vector scatter instruction valid flag storage section 43, if the vector instruction sent from the instruction issuing section 2 is the vector scatter instruction. The vector scatter instruction valid flag (stage 1-#2) is sent as the vector scatter instruction valid flag (stage 2-#2) to the lower stage vector scatter instruction flag storage section 44 in synchronism with the system clock signal.

The vector scatter instruction valid flag is used to determine the order of the vector scatter instruction and the other instructions and also indicates the existence of the vector scatter instruction. The vector scatter instruction is stored in the vector gather/store/scatter instruction storage section 61.

The overtaking control circuit 1 further includes a vector store instruction decoder 50, an upper stage vector store instruction valid flag storage section, a lower stage vector store instruction valid flag storage section and a vector store instruction address store register. Each of the upper stage vector store instruction valid flag storage section, the lower stage vector store instruction valid flag storage section and the vector store instruction address store register is sufficient to be provided one or more. The upper stage vector store instruction valid flag storage section has upper stage vector store instruction valid flag storage sections 51 and 53. The lower stage vector store instruction valid flag storage section has lower stage vector store instruction valid flag storage sections 52 and 54. The vector store instruction address store register has vector store instruction address store registers 55 and 56. The vector store instruction decoder 50 is connected to the instruction issuing section 2. The upper stage vector store instruction valid flag storage sections 51 and 53 and the vector store instruction address store registers 55 and 56 are connected to the vector store instruction decoder 50. The lower stage vector store instruction valid flag storage sections 52 and 54 are connected to the upper stage vector store instruction valid flag storage sections 51 and 53, respectively.

The vector store instruction decoder 50 decodes the vector instruction sent from the instruction issuing section 2 to detect the vector store instruction. If the vector instruction is the vector store instruction, the vector store instruction decoder 50 sets a vector store instruction valid flag (stage 1-#1) in the upper stage vector store instruction valid flag storage section 51 and simultaneously stores an address region (#1) related to the vector store instruction in the vector store instruction address store register 55. The vector store instruction valid flag (stage 1-#1) is sent as a vector store instruction valid flag (stage 2-#1) to the lower stage vector store instruction valid flag storage section 52 in synchronism with the system clock signal.

Next, the vector store instruction decoder 50 sets a vector store instruction valid flag (stage 1-#2) in the upper stage vector store instruction valid flag storage section 52, if the vector instruction sent from the instruction issuing section 2 is the vector store instruction and simultaneously sets an address region (#2) related to the vector store instruction in the vector store instruction address store register 56. The vector store instruction valid flag (stage 1-#2) is sent as the vector store instruction valid flag (stage 2-#2) to the lower stage vector store instruction memory 44 in synchronism with the system clock signal. The vector scatter instruction valid flag is used to determine the order of the vector scatter instruction and the other instructions, and the vector store instruction is stored in the vector gather/store/scatter instruction storage section 61.

The overtaking control circuit 1 further includes an address region determining section. The address region determining section is sufficient to be provided at least one, and address region determining regions 57 and 58 are provided. The address region determining sections 57 and 58 are connected to the vector store instruction address store registers 55 and 56, respectively. The address region determining sections 57 and 58 are connected to the vector load instruction register 22.

The address region determining section 57 checks whether or not at least a portion of the address region related to the vector load instruction stored in the vector load instruction register 22 and at least a portion of the address region (#1) stored in the vector store instruction address store register 55 overlap (coincide) and determines whether or not the vector load instruction can overtake the vector store instruction. When the address region related to the vector load instruction stored in the vector load instruction register 22 and the address region (#1) stored in the vector store instruction address store register 55 overlap, the address region determining section 57 outputs a vector store instruction overtaking prohibition data. The vector store instruction overtaking prohibition data indicates that the vector load instruction is prohibited to overtake the vector store instruction.

When the address region related to the vector load instruction stored in the vector load instruction register 22 and the address region (#1) stored in the vector store instruction address store register 55 does not overlap, the address region determining section 57 outputs a vector store instruction overtaking permission data. The vector store instruction overtaking permission data indicates that the vector load instruction is permitted to overtake the vector store instruction.

The address region determining section 58 checks whether or not at least a portion of the address region related to the vector load instruction stored in the vector load instruction register 22 and at least a portion of the address region (#2) stored in the vector store instruction address store register 56 overlap (coincide) and determines whether or not the vector load instruction can overtake the vector store instruction. When the address region related to the vector load instruction stored in the vector load instruction register 22 and the address region (#2) stored in the vector store instruction address store register 56 overlap, the address region determining section 58 outputs the vector store instruction overtaking prohibition data. When the address region related to the vector load instruction stored in the vector load instruction register 22 and the address region (#2) stored in the vector store instruction address store register 56 do not overlap, the address region determining section 58 outputs the vector store instruction overtaking permission data.

The overtaking control circuit 1 further includes a store data & list address storage section 70. The store data & list address storage section 70 is connected to the store data & address data preparing section 4. The store data & list address storage section 70 stores as data, the store data and list address, which are sent from the store data & address data preparing section 4, and simultaneously sets a valid bit indicating that the stored store data and list address are valid. The store data & list address storage section 70 outputs the stored instructions in the stored order in accordance with the FIFO control.

The overtaking control circuit 1 further includes an overtaking determining section 10. The overtaking determining section 10 is connected to the vector load instruction validation flag storage section 21, the lower stage vector scatter instruction valid flag storage sections 42 and 44, the lower stage vector store instruction valid flag storage sections 52 and 54 and the address region determining sections 57 and 58. The overtaking determining section 10 determines whether or not the following vector load instruction can overtake the vector store instruction and the vector scatter instruction, based on the above-mentioned flags set in the vector load instruction validation flag storage section 21, lower stage vector scatter instruction valid flag storage sections 42 and 44 and lower stage vector store instruction valid flag storage sections 52 and 54, and the determination results from the address region determining sections 57 and 58 (vector store instruction overtaking permission data/vector store instruction overtaking prohibition data).

For example, when the vector load instruction valid flag is set in the vector load instruction validation flag storage section 21, the vector scatter instruction valid flags (stage 2-#1, stage 2-#2) are set in the lower stage vector scatter instruction valid flag storage sections 42 and 44, and the vector store instruction valid flags (stage 2-#1, stage 2-#2) are not set in the lower stage vector store instruction valid flag storage sections 52 and 54, the overtaking determining section 10 outputs the vector scatter instruction overtaking prohibition data as the determination result. The vector scatter instruction overtaking prohibition data indicates that the vector load instruction is prohibited to overtake the vector scatter instruction.

For example, even if the vector load instruction valid flag is set in the vector load instruction validation flag storage section 21, the vector scatter instruction valid flags (stage 2-#1, stage 2-#2) are not set in the lower stage vector scatter instruction valid flag storage sections 42 and 44, and the vector store instruction valid flags (stage 2-#1, stage 2-#2) are set in the lower stage vector store instruction valid flag storage sections 52 and 54, the determination result from the address region determining sections 57 and 58 indicate the vector store instruction overtaking prohibition data. In this case, the overtaking determining section 10 outputs the vector store instruction overtaking prohibition data as the determination result.

For example, when the vector load instruction valid flag is set in the vector load instruction validation flag storage section 21, the vector scatter instruction valid flags (stage 2-#1, stage 2-#2) are set in the lower stage vector scatter instruction valid flag storage sections 42 and 44, and the vector store instruction valid flags (stage 2-#1, stage 2-#2) are set for the lower stage vector store instruction valid flag storage sections 52 and 54, the determination results from the address region determining sections 57 and 58 indicate the vector store instruction overtaking prohibition data. In this case, the overtaking determining section 10 outputs the vector scatter instruction overtaking prohibition data and the vector store instruction overtaking prohibition data as the judgment result.

For example, even if the vector load instruction valid flag is set in the vector load instruction validation flag storage section 21, the vector scatter instruction valid flags (stage 2-#1, stage 2-#2) are set for the lower stage vector scatter instruction valid flag storage sections 42 and 44, and the vector store instruction valid flags (stage 2-#1, stage 2-#2) are set for the lower stage vector store instruction valid flag storage sections 52 and 54, the determination results from the address region determining sections 57 and 58 indicate the vector store instruction overtaking permission data. In this case, the overtaking determining section 10 outputs the vector scatter instruction overtaking prohibition data and the vector store instruction overtaking permission data.

For example, even if the vector load instruction valid flag is set in the vector load instruction validation flag storage section 21, the vector scatter instruction valid flags (stage 2-#1, stage 2-#2) are not set for the lower stage vector scatter instruction valid flag storage sections 42 and 44, and the vector store instruction valid flags (stage 2-#1, stage 2-#2) are set for the lower stage vector store instruction valid flag storage sections 52 and 54, the determination results from the address region determining sections 57 and 58 indicate the vector store instruction overtaking permission data. In this case, the overtaking determining section 10 outputs the vector store instruction overtaking permission data as the judgment result.

The overtaking control circuit 1 further includes a vector gather/store/scatter instruction order holding section 11. The vector gather/store/scatter instruction order holding section 11 is connected to the lower stage vector gather instruction valid flag storage sections 32 and 34, the lower stage vector scatter instruction valid flag storage sections 42 and 44 and the lower stage vector store instruction valid flag storage sections 52 and 54.

The vector gather/store/scatter instruction order holding section 11 monitors the above-mentioned flags, which are set in the lower stage vector gather instruction valid flag storage sections 32 and 34, the lower stage vector scatter instruction valid flag storage sections 42 and 44 and the lower stage vector store instruction valid flag storage sections 52 and 54. The vector gather/store/scatter instruction order holding section 11 stores therein the order in which the above-mentioned flags are set in the lower stage vector gather instruction valid flag storage sections 32 and 34, the lower stage vector scatter instruction valid flag storage sections 42 and 44 and the lower stage vector store instruction valid flag storage sections 52 and 54, and outputs the order data indicating the order.

The overtaking control circuit 1 further includes a permission wait vector gather/store/scatter instruction determining section 12. The permission wait vector gather/store/scatter instruction determining section 12 is connected to the lower stage vector gather instruction valid flag storage sections 32 and 34, the lower stage vector scatter instruction valid flag storage sections 42 and 44 and the lower stage vector store instruction valid flag storage sections 52 and 54. The permission wait vector gather/store/scatter instruction determining section 12 monitors the above-mentioned flags set in the lower stage vector gather instruction valid flag storage sections 32 and 34, lower stage vector scatter instruction valid flag storage sections 42 and 44 or lower stage vector store instruction valid flag storage sections 52 and 54, and determines whether or not the vector gather instruction, vector scatter instruction or vector store instruction exists (is valid) based on the set flags. The permission wait vector gather/store/scatter instruction determining section 12 outputs a vector instruction valid data as the determination result, when the above-mentioned flags are set in the lower stage vector gather instruction valid flag storage sections 32 and 34, lower stage vector scatter instruction valid flag storage sections 42 and 44 or lower stage vector store instruction valid flag storage sections 52 and 54. The vector instruction valid data indicates the existence of the vector instruction (vector gather instruction, vector scatter instruction or vector store instruction) based on the set flags.

The overtaking control circuit 1 further includes a vector gather/store/scatter instruction output determining section 13. The vector gather/store/scatter instruction output determining section 13 is connected to the store data & list address storage section 70 and the permission wait vector gather/store/scatter instruction determining section 12.

The vector gather/store/scatter instruction output determining section 13 determines whether or not the vector gather instruction, vector store instruction or vector scatter instruction can be sent to the instruction executing section 3, based on the determination result (vector instruction valid data) outputted from the permission wait vector gather/store/scatter instruction determining section 12, and the store data and list address data outputted from the store data & list address storage section 70.

For example, the determination result indicating the existence of the vector gather instruction is outputted from the permission wait vector gather/store/scatter instruction determining section 12 to the vector gather/store/scatter instruction output determining section 13. The list address is outputted from the store data & list address storage section 70. In this case, the vector gather/store/scatter instruction output determining section 13 outputs a vector gather instruction check data as the determination result. The vector gather instruction check data indicates that the vector gather instruction can be sent to the instruction executing section 3.

For example, the determination result indicating the existence of the vector store instruction is outputted from the permission wait vector gather/store/scatter instruction determining section 12 to the vector gather/store/scatter instruction output determining section 13, and the stored data is outputted from the store data & list address storage section 70. In this case, the vector gather/store/scatter instruction output determining section 13 outputs a vector store instruction check data as the determination result. The vector store instruction check data indicates that the vector store instruction can be sent to the instruction executing section 3.

For example, the determination result indicating the existence of the vector scatter instruction is outputted from the permission wait vector gather/store/scatter instruction determining section 12 to the vector gather/store/scatter instruction output determining section 13. The list address and the store data are outputted from the store data & list address storage section 70. In this case, the vector gather/store/scatter instruction output determining section 13 outputs a vector scatter instruction check data as the determination result. The vector scatter instruction check data indicates that the vector scatter instruction can be sent to the instruction executing section 3.

The overtaking control circuit 1 further includes an output instruction determining section 14 and an output instruction selecting section 15. The output instruction determining section 14 is connected to the overtaking determining section 10, the vector gather/store/scatter instruction order holding section 11, the permission wait vector gather/store/scatter instruction determining section 13 and the vector load instruction validation flag storage section 21. The output instruction selecting section 15 is connected to the instruction issuing section 2, the instruction executing section 3, the output instruction determining section 14, the vector load instruction register 22 and the vector gather/store/scatter instruction storage section 61.

The output instruction determining section 14 outputs the determination result indicating the vector instruction (vector load instruction, vector gather instruction, vector store instruction or vector scatter instruction) to be sent to the instruction executing section 3 to the output instruction selecting section 15, based on the determination result (the vector scatter instruction overtaking prohibition data, vector store instruction overtaking prohibition data or vector store instruction overtaking permission data) from the overtaking determining section 10, the order data from the vector gather/store/scatter instruction order holding section 11, the determination result (the vector gather instruction, vector store instruction check data or vector scatter instruction check data) from the vector gather/store/scatter instruction output determining section 13, and the vector load instruction valid flag stored in the vector load instruction validation flag storage section 21.

The output instruction selecting section 15 responds to the determination result from the output instruction determining section 14, selects the vector load instruction stored in the vector load instruction register 22 or the vector instruction (the vector gather instruction, vector store instruction or vector scatter instruction) from the vector gather/store/scatter instruction data storage section 61, or the vector load instruction from the instruction issuing section 2, and outputs (transfers) as the output instruction to the instruction executing section 3.

The output operations of the output instruction determining section 14 and output instruction selecting section 15 will be described below in detail. In the memory access in the vector processing apparatus of the present invention, when the vector load instruction overtakes the vector gather instruction or the vector store instruction, there are the following cases: (1) the following third instruction (vector load instruction) can overtake one preceding vector instruction, (2) the following third instruction (vector load instruction) can overtake two preceding vector instructions, (3) the following third instruction (vector load instruction) can overtake three preceding vector instructions, and (4) the following third instruction (vector load instruction) can overtake four preceding vector instructions.

As the example, the above case (2) will be described, in which the first instruction is the vector store instruction, the second instruction is the vector gather instruction, and the following third instruction (vector load instruction) overtakes the preceding first instruction (vector store instruction) and second instruction (vector gather instruction). The instruction issuing section 2 is supposed to have sent the first, second and third instructions to the overtaking control circuit 1 in the order of the first, second and third instructions. The third instruction is supposed to be the vector load instruction.

In this case, the vector gather/store/scatter instruction output determining section 13 sends the determination result to the output instruction determining section 14 to indicate the vector gather instruction check data for the first instruction (vector store instruction) and the vector gather instruction check data for the second instruction (vector gather instruction).

The output instruction determining section 14 outputs an overtaking permission signal, a first instruction output permission signal and a second instruction output permission signal, as the determination result to the output instruction selecting section 15 in the order of the overtaking permission signal, the first instruction output permission signal and the second instruction output permission signal, in accordance with the determination result from the overtaking determining section 10, the order data from the vector gather/store/scatter instruction order holding section 11 and the vector load instruction valid flag stored in the vector load instruction validation flag storage section 21.

The output instruction selecting section 15 responds to the overtaking permission signal that is the determination result from the output instruction determining section 14, and outputs the third instruction (vector load instruction) stored in the vector load instruction register 22 as the output instruction to the instruction executing section 3. The output instruction selecting section 15 responds to the first instruction output permission signal that is the determination result from the output instruction determining section 14 and outputs the first instruction (vector store instruction) from the vector gather/store/scatter instruction storage section 61 to the instruction executing section 3. The output instruction selecting section 15 responds to the second instruction output permission signal that is the determination result from the output instruction determining section 14 and outputs (transfers) the second instruction (vector gather instruction) from the vector gather/store/scatter instruction storage section 61 as the output instruction to the instruction executing section 3.

In this way, according to the vector processing apparatus of the present invention, since the following vector load instruction can overtake the vector store instruction and the vector gather instruction, the memory access can be made faster than that of the conventional vector processing apparatus. Thus, in the vector processing apparatus of the present invention, during the preparation time to execute the vector store instruction and vector gather instruction, the vector load instruction is carried out, which can consequently reduce the waiting time for the transfer of the vector load instruction to the instruction executing section 3. Therefore, the process time necessary for the memory access can be greatly improved.

As the operation of the vector processing apparatus of the present invention, the instruction executing process (overtaking control) will be described below.

Figure 4:
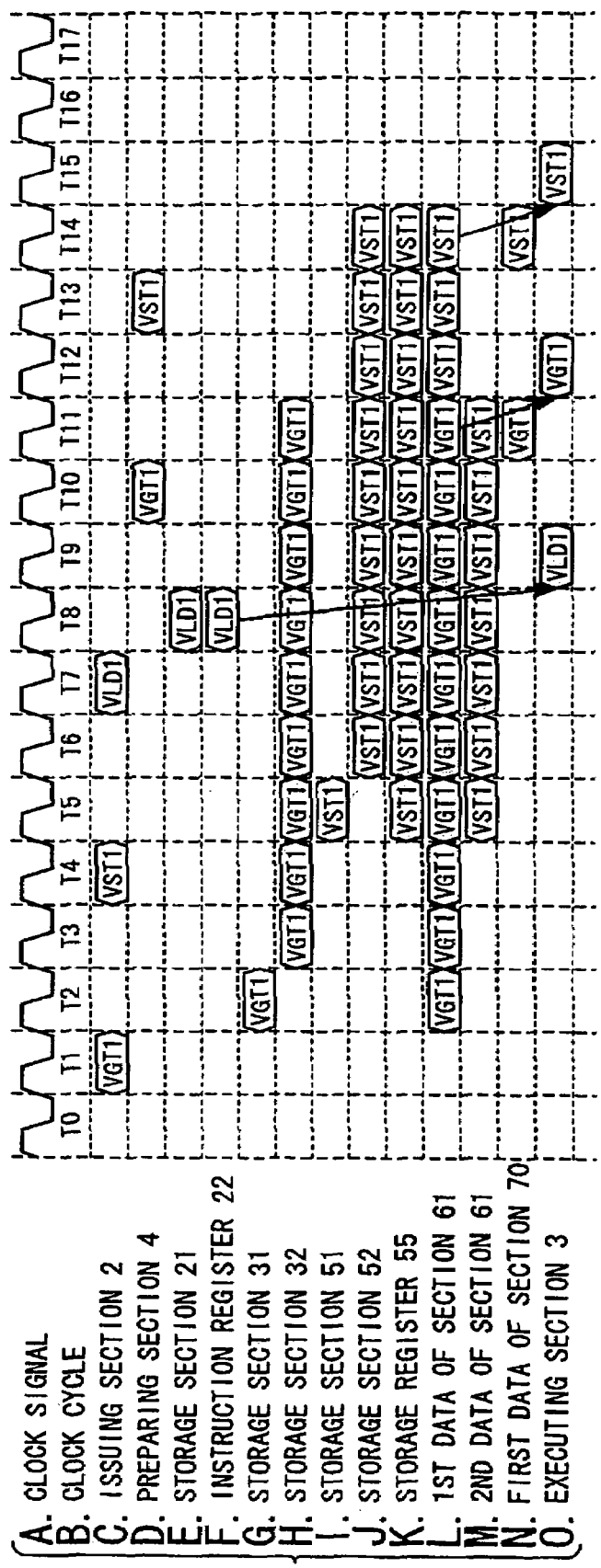
FIGS. 4A to 4O are timing charts showing an operation of an instruction executing process (overtaking control) in the vector processing apparatus of the present invention.

At first, as the operation of the vector processing apparatus of the present invention, the above-mentioned case (2) will be described with reference to FIG. 4. The case (2) is supposed that the first instruction is the vector gather instruction, the second instruction is the vector store instruction, and the third instruction is the vector load instruction. In this case, it is supposed that the instruction issuing section 2 sends a vector gather instruction (VGT1), a vector store instruction (VST1) and a vector load instruction (VLD1) to the overtaking control circuit 1, in the order of the vector gather instruction (VGT1) as the first instruction, the vector store instruction (VST1) as the second instruction and the vector load instruction (VLD1) as the third instruction. Also, it is supposed that the address region related to the vector store instruction (VST1) and the address region related to the vector load instruction (VLD1) do not overlap. In this case, as shown in FIG. 4, the following third instruction (vector load instruction) can overtake the preceding first instruction (vector store instruction) and second instruction (vector store instruction).

In a clock cycle T1 of the above-mentioned system clock signal, the instruction issuing section 2 issues the vector gather instruction (VGT1) to the overtaking control circuit 1. When sending the vector gather instruction (VGT1) to the overtaking control circuit 1, the instruction issuing section 2 outputs the vector gather instruction transfer data indicating that the vector gather instruction (VGT1) is sent, to the store data &address data preparing section 4.

The vector gather instruction decoder 30 decodes the vector gather instruction (VGT1) sent from the instruction issuing section 2 and sets the vector gather instruction valid flag (stage 1-#1) for the upper stage VGT (vector gather) instruction valid flag storage section 31 in a next clock cycle T2 after the clock cycle T1.

The vector gather/store/scatter instruction decoder 60 decodes the vector gather instruction (VGT1) sent from the instruction issuing section 2 and stores the decoded vector gather instruction (VGT1) as data in the vector gather/store/scatter instruction storage section 61 in the clock cycle T2.

The vector gather instruction valid flag (stage 1-#1) is sent to the lower stage VGT (vector gather) instruction valid flag storage section 32 as the vector gather instruction valid flag (stage 2-#1) in a next clock cycle T3 after the clock cycle T2.

In a next clock cycle T4 after the clock cycle T3, the instruction issuing section 2 issues the vector store instruction (VST1) to the overtaking control circuit 1. When sending the vector store instruction (VST1) to the overtaking control circuit 1, the instruction issuing section 2 outputs the vector store instruction transfer data indicating that the vector store instruction (VST1) is sent, to the store data & address data preparing section 4.

The vector store instruction decoder 50 decodes the vector store instruction (VST1) sent from the instruction issuing section 2 and sets the vector store instruction valid flag (stage 1-#1) in the upper stage VST (vector store) instruction valid flag storage section 51 in a next clock cycle T5 after the clock cycle T4. At the same time, the vector store instruction decoder 50 stores the address region (#1) related to the decoded vector store instruction (VST1) in the VST (vector store) instruction address store register 55.

The vector gather/store/scatter instruction decoder 60 decodes the vector store instruction (VST1) sent from the instruction issuing section 2 and stores the decoded vector store instruction (VST1) as data in the VGT/VST/VSC (vector gather/vector store/vector diffusion) instruction storage section 61 in the clock cycle T5.

The vector store instruction valid flag (stage 1-#1) is sent to the lower stage VST (vector store) instruction valid flag storage section 52 as the vector store instruction valid flag (stage 2-#1) in a next clock cycle T6 after the clock cycle T5.

In a next clock cycle T7 after the clock cycle T6, the instruction issuing section 2 gives the vector load instruction (VLD1) to the overtaking control circuit 1.

The vector load instruction decoder 20 decodes the vector load instruction (VLD1) sent from the instruction issuing section 2 and sets the vector load instruction valid flag for the VLD (vector load) instruction validation flag storage section 21 in a next clock cycle T8 after the clock cycle T7. At the same time, the vector load instruction decoder 20 stores the decoded vector load instruction (VLD1) in the VLD (vector load) instruction register 22.

In the clock cycle T8, the overtaking control circuit 1 carries out a determination for the overtaking control. The address region determining section 57 checks the address region related to the vector load instruction (VLD1) stored in the vector load instruction register 22 and the address region (#1) stored in the vector store instruction address store register 55 and determines whether or not the address regions overlap. In this case, when the address region related to the vector load instruction (VLD1) and the address region (#1) related to the vector store instruction (VST1) do not overlap, the address region determining section 57 outputs the vector store instruction overtaking permission data as the determination result.

Even if the vector load instruction valid flag is set in the vector load instruction validation flag storage section 21 and the vector store instruction valid flag (stage 2-#1) is set in the lower stage vector store instruction valid flag storage section 52, the determination result from the address region determining section 57 indicates the vector store instruction overtaking permission data. Therefore, the overtaking determining section 10 outputs the vector store instruction overtaking permission data as the determination result.

The output instruction determining section 14 outputs the overtaking permission signal in the vector load instruction (VLD1) as the determination result to the output instruction selecting section 15, based on the determination result from the overtaking determining section 10, the order data from the vector gather/store/scatter instruction order holding section 11, the determination result from the vector gather/store/ scatter instruction output determining section 13, and the vector load instruction valid flag stored in the vector load instruction validation flag storage section 21. Here, when the vector load instruction valid flag stored in the vector load instruction validation flag storage section 21 is read by the output instruction determining section 14, the vector load instruction valid flag stored in the vector load instruction validation flag storage section 21 is reset.

In a next clock cycle T9 after the clock cycle T8, the output instruction selecting section 15 responds to the overtaking permission signal as the determination result from the output instruction determining section 14 and outputs the vector load instruction (VLD1) stored in the vector load instruction register 22 as the output instruction to the instruction executing section 3.

The store data & address data preparing section 4 receives the vector gather instruction transfer data outputted from the instruction issuing section 2 in the clock cycle T1 and outputs the list address corresponding to the vector gather instruction (VGT1) in synchronism with the system clock signal after the elapse of a predetermined time (8 cycles in FIGS. 4A to 4O).

At this time, in a next clock cycle T10 after the clock cycle T9, the store data & address data preparing section 4 gives the list address of the vector gather instruction (VGT1) to the overtaking control circuit 1.

In a next clock cycle T11 after the clock cycle T10, the store data & list address storage section 70 stores the list address of the vector gather instruction (VGT1) sent from the store data & address data preparing section 4 as data, and simultaneously sets a valid bit indicating that the list address of the stored vector gather instruction (VGT1) is valid.

At this time, the output instruction determining section 14 determines that the vector gather instruction (VGT1) can be outputted, based on the determination result from the vector gather/store/scatter instruction output determining section 13 and the valid bit set for the store data & list address storage section 70.

In the clock cycle T11, the output instruction determining section 14 outputs the first instruction output permission signal in the vector gather instruction (VGT1) as the determination result to the output instruction selecting section 15, based on the order data from the vector gather/store/scatter instruction order holding section 11 and the determination result from the vector gather/store/scatter instruction output determining section 13.

In a next clock cycle T12 after the clock cycle T11, the output instruction selecting section 15 outputs the vector gather instruction (VGT1) sent from the vector gather/store/scatter instruction data storage section 61 as the output instruction to the instruction executing section 3 in response to the first instruction output permission signal that is the determination result from the output instruction determining section 14.

The store data & address data preparing section 4 receives the vector store instruction transfer data outputted from the instruction issuing section 2 in the clock cycle T4 and outputs the list address corresponding to the vector store instruction (VST1) in synchronism with the system clock signal after the elapse of the predetermined time (the 8 cycles in FIGS. 4A to 4O). At this time, in a next clock cycle T13 after the clock cycle T12, the store data & address data preparing section 4 gives the vector store instruction (VST1) to the overtaking control circuit 1.

In a next clock cycle T14 after the clock cycle T13, the store data & list address storage section 70 stores the store data of the vector store instruction (VST1) sent from the store data & address data preparing section 4 as data, and simultaneously sets a valid bit indicating that the stored store data of the vector store instruction (VST1) is valid. At this time, the output instruction determining section 14 determines that the vector store instruction (VST1) can be outputted, based on the determination result from the vector gather/store/scatter instruction output determining section 13 and the valid bit set for the store data & list address storage section 70.

In the clock cycle T14, the output instruction determining section 14 outputs the second instruction output permission signal in the vector store instruction (VST1) as the determination result to the output instruction selecting section 15, based on the order data from the vector gather/store/scatter instruction order holding section 11 and the determination result from the vector gather/store/scatter instruction output determining section 13.

In a next clock cycle T15 after the clock cycle T14, the output instruction selecting section 15 outputs the vector store instruction (VST1) from the vector gather/store/scatter instruction data storage section 61 as the output instruction to the instruction executing section 3 in response to the second instruction output permission signal as the determination result from the output instruction determining section 14.

In the above-mentioned case (2), the instruction executing process (overtaking control) is applied to the vector processing apparatus of the present invention, when the first instruction is the vector gather instruction (VGT1), the second instruction is the vector store instruction (VST1), the third instruction is the vector load instruction (VLD1), and the address region related to the vector store instruction (VST1) and the address region related to the vector load instruction (VLD1) do not overlap. Thus, the following vector load instruction (VLD1) can overtake the preceding vector gather Instruction (VGT1) and vector store instruction (VST1). For this reason, in the vector processing apparatus of the present invention to which the instruction executing process (overtaking control) is applied, it is not necessary to wait for the fact that the vector gather instruction (VGT1) and the vector store instruction (VST1) are sent to the instruction executing section 3 before the vector load instruction (VLD1).

A case will be described in which the instruction executing process (overtaking control) is not employed in the vector processing apparatus. That is, the vector processing apparatus does not include the overtaking determining section 10, the output instruction determining section 14 and the output instruction selecting section 15, which are required by the instruction executing process (overtaking control) in the present invention.

Figure 5:
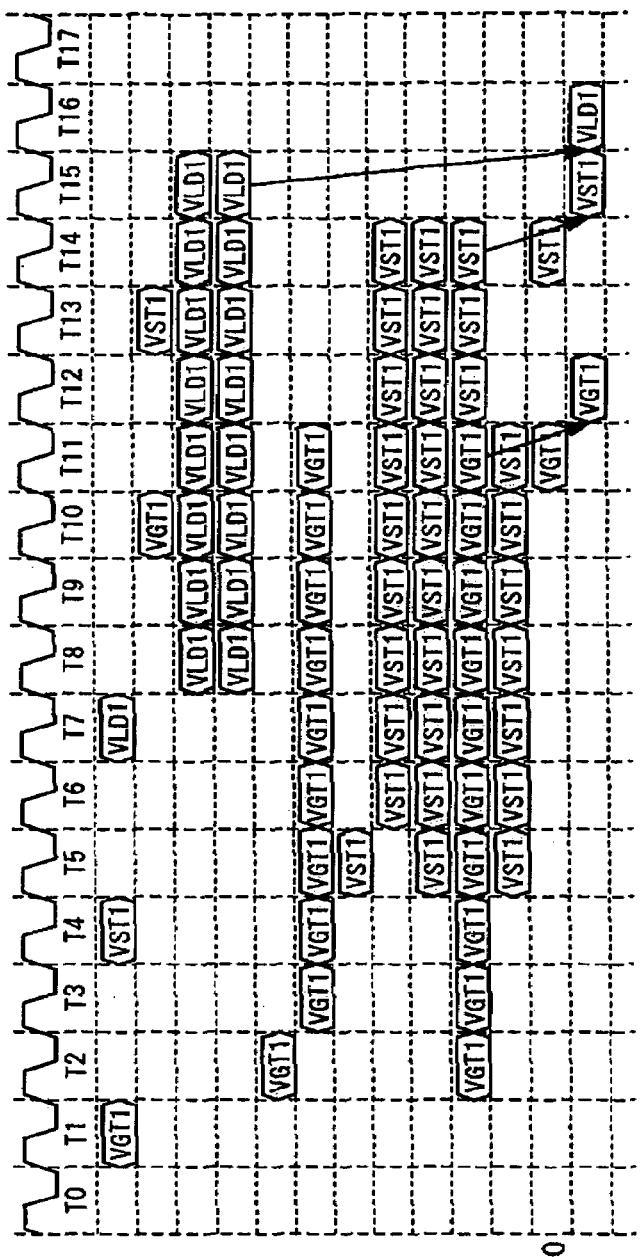
FIGS. 5A to 5O are timing charts showing an operation of the vector processing apparatus in which an overtaking control process is not employed.

As shown in FIGS. 5A to 5O, it is impossible in the vector processing apparatus that does not employ the instruction executing process (overtaking control) that the following vector load instruction (VLD1) overtakes the preceding vector gather instruction (VGT1) and vector store instruction (VST1), when the first instruction is the vector gather instruction (VGT1), the second instruction is the vector store instruction (VST1), the third instruction is the vector load instruction (VLD1), and the address region related to the vector store instruction (VST1) and the address region related to the vector load instruction (VLD1) do not overlap. That is, if the overtaking control is not carried out, the respective instructions are sent to the instruction executing section 3 in the issue order. For this reason, in the vector processing apparatus that does not employ the instruction executing process (overtaking control), the vector load instruction (VLD1) needs to wait for the fact that the vector gather instruction (VGT1) and the vector store instruction (VST1) are sent to the instruction executing section 3.

A case will be described in which the instruction executing process (overtaking control) noted in the first to fifth conventional examples is applied to the vector processing apparatus. That is, the vector processing apparatus in the first to fifth conventional examples does not include the overtaking determining section 10 and output instruction determining section 14 that are necessary for the instruction executing process (overtaking control) in the present invention, and includes the determining section (the determining circuit and the judging circuit) noted in the first to fifth conventional examples.

Figure 6:
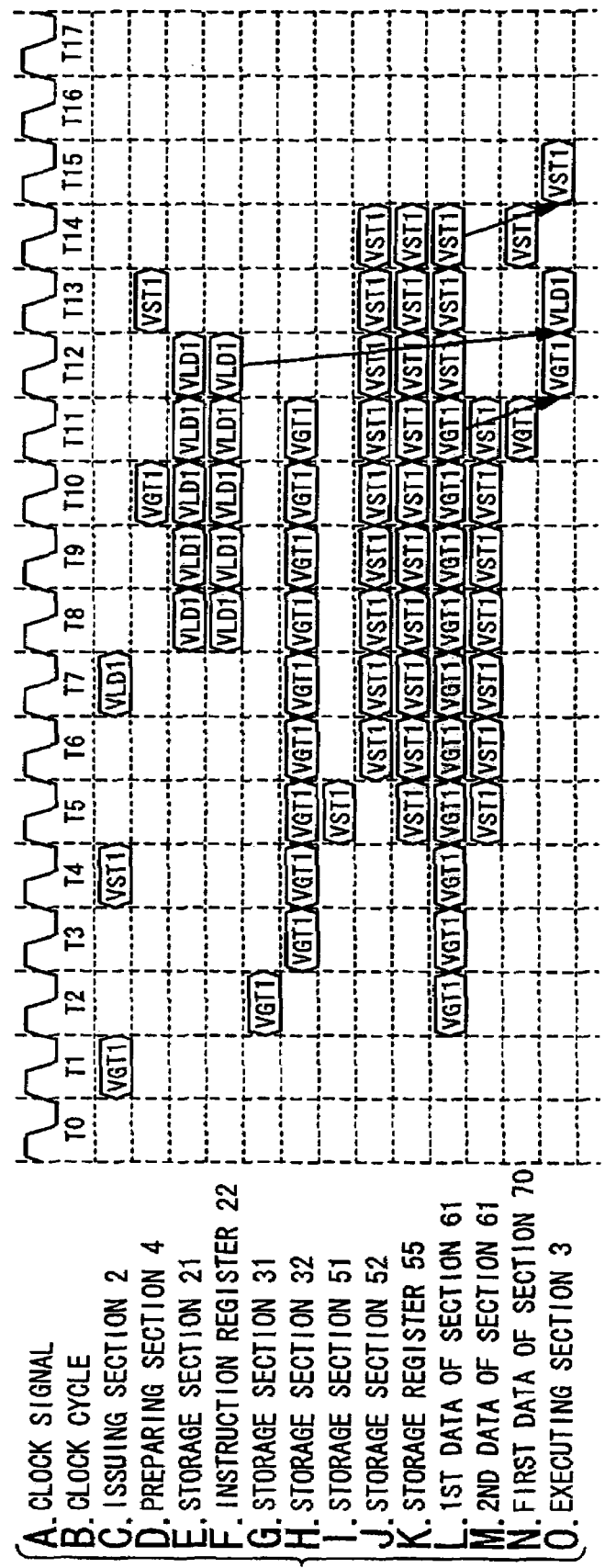
FIGS. 6A to 6O are timing charts showing an operation of the instruction executing process (overtaking control) in a vector processing apparatus in which an overtaking control process is not employed.

As shown in FIGS. 6A to 6O, in the vector processing apparatus in the first to fifth conventional examples, when the first instruction is the vector gather instruction (VGT1), the second instruction is the vector store instruction (VST1), the third instruction is the vector load instruction (VLD1), and the address region related to the vector store instruction (VST1) and the address region related to the vector load instruction (VLD1) do not overlap, the following vector load instruction (VLD1) can overtake the preceding vector store instruction (VST1). However, the following vector load instruction (VLD1) cannot overtake the preceding vector gather instruction (VGT1). For this reason, in the vector processing apparatus in the first to fifth conventional examples is applied, when the instruction executing process (overtaking control) is applied, the vector load instruction (VLD1) needs to wait for the fact that the vector gather instruction (VGT1) is sent to the instruction executing section 3.

As the operation of the vector processing apparatus of the present invention, the above-mentioned case (2) will be described below with reference to FIGS. 7A to 7O. In the case (2), it is supposed that the first instruction is the vector store instruction, the second instruction is the vector gather instruction, and the third instruction is the vector load instruction. In this case, the instruction issuing section 2 is supposed to send the vector store instruction (VST1), the vector gather instruction (VGT1) and the vector load instruction (VLD1), in the order of the vector store instruction (VST1) as the first instruction, the vector gather instruction (VGT1) as the second instruction, and the vector load instruction (VLD1) as the third instruction. Also, it is supposed that the address region related to the vector store instruction (VST1) and the address region related to the vector load instruction (VLD1) do not overlap.

Figure 7:
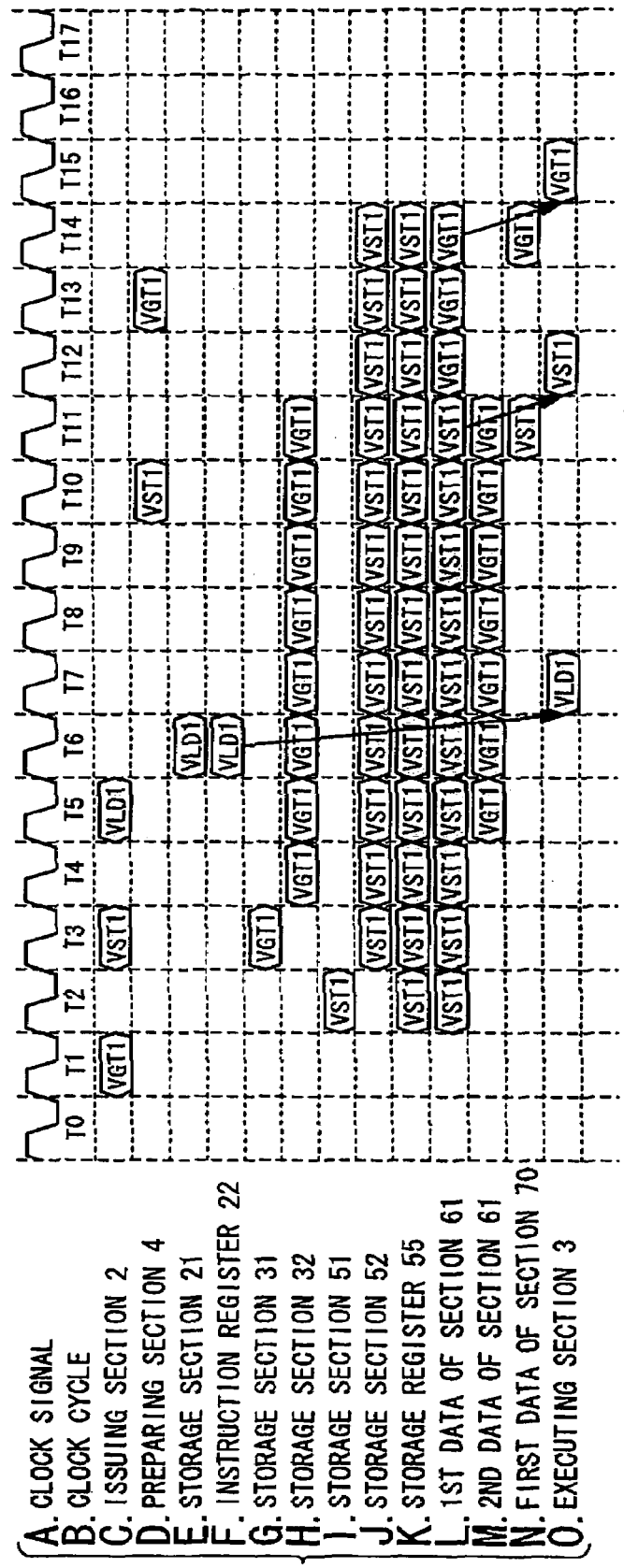
FIGS. 7A to 7O are timing charts showing an operation of the instruction executing process (overtaking control) in the vector processing apparatus of the present invention.

In this case, as shown in FIGS. 7A to 7O, in the vector processing apparatus to which the instruction executing process (overtaking control) of the present invention is applied, the following vector load instruction (VLD1) can overtake the preceding vector store instruction (VST1) and vector gather instruction (VGT1). For this reason, in the vector processing apparatus to which the instruction executing process (overtaking control) in the present invention is applied, the vector load instruction (VLD1) does not need to wait for the fact that the vector store instruction (VST1) and the vector gather instruction (VGT1) are sent to the instruction executing section 3.

Figure 8:
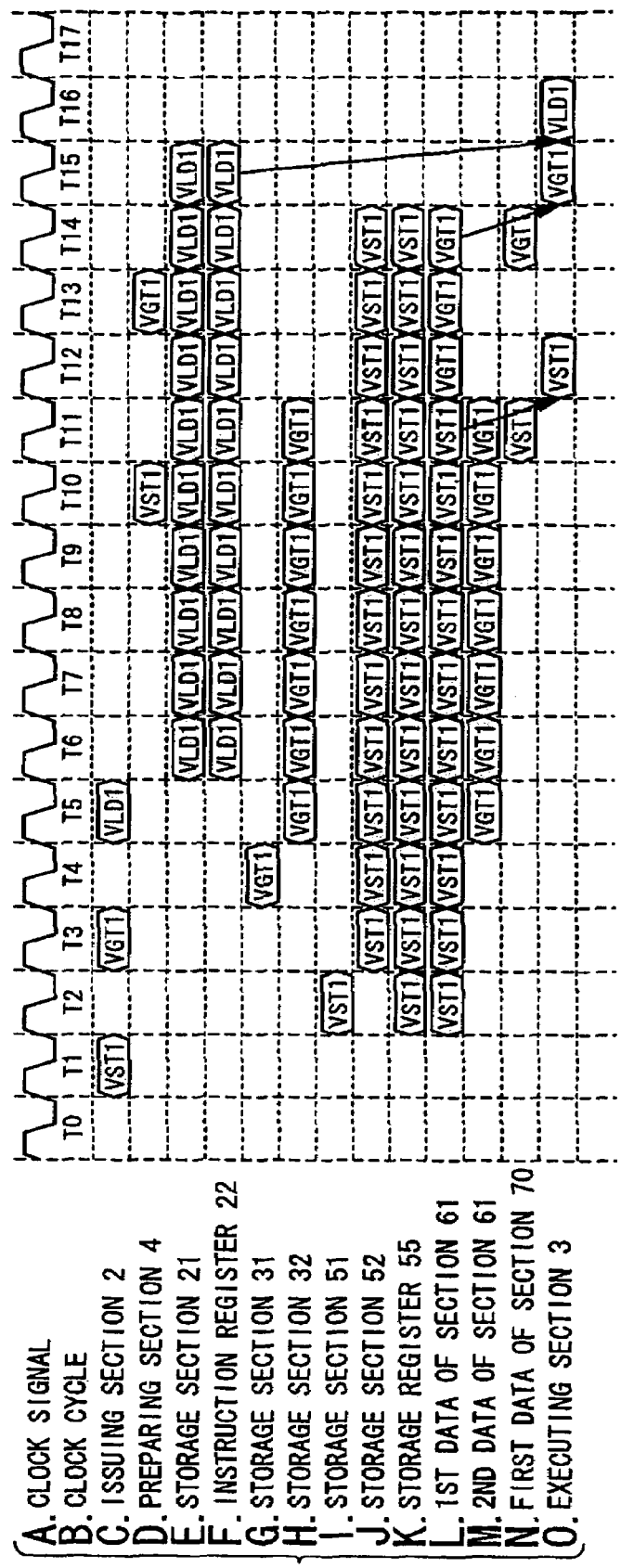
FIGS. 8A to 8O are timing charts showing an operation of the vector processing apparatus in which an overtaking control process is not employed.

A case will be described in which the vector processing apparatus does not employ the instruction executing process (overtaking control). As shown in FIGS. 8A to 8O, in the vector processing apparatus that does not employ the instruction executing process (overtaking control), when the first instruction is the vector store instruction (VST1), the second instruction is the vector gather instruction (VGT1), the third instruction is the vector load instruction (VLD1), and the address region related to the vector store instruction (VST1) and the address region related to the vector load instruction (VLD1) do not overlap, the following vector load instruction (VLD1) cannot overtake the preceding vector store instruction (VST1) and vector gather instruction (VGT1). That is, when the overtaking control is not carried out, the respective instructions are sent to the instruction executing section 3 in the issue order. For this reason, in the vector processing apparatus that does not employ the instruction executing process (overtaking control), the vector load instruction (VLD1) needs to wait for the fact that the vector store instruction (VST1) and the vector gather instruction (VGT1) are sent to the instruction executing section 3.

Figure 9:
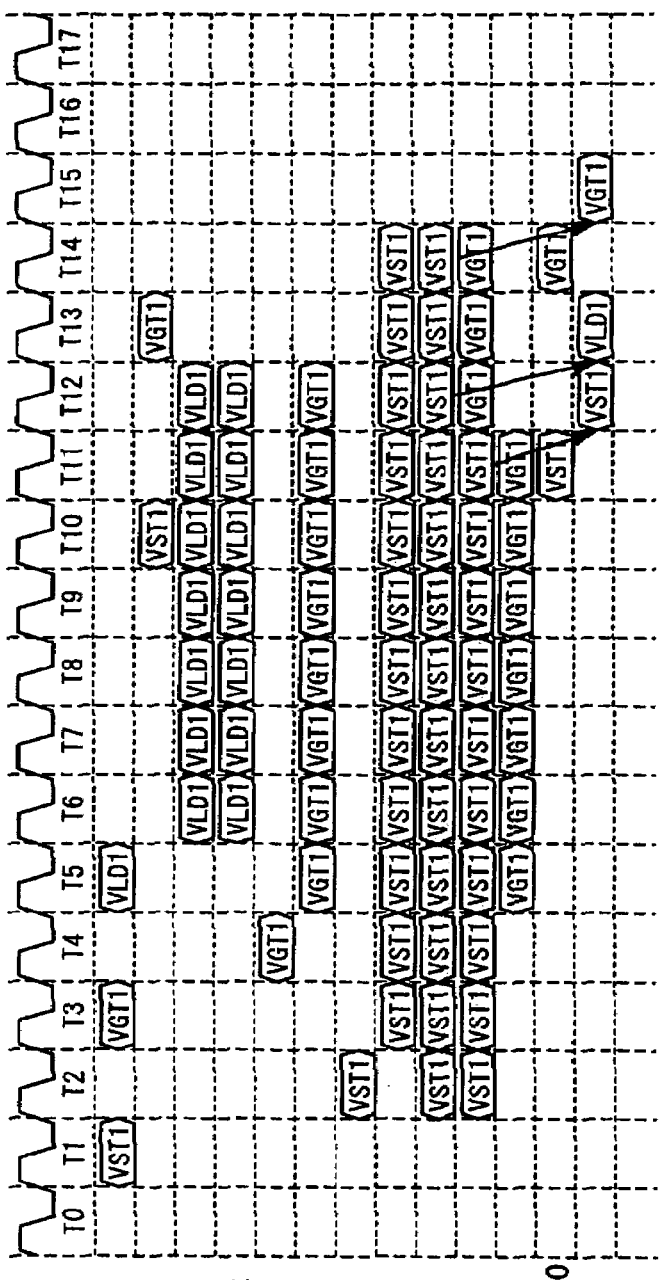

The case will be described in which the instruction executing process (overtaking control) noted in the first to fifth conventional examples is applied to the vector processing apparatus. As shown in FIGS. 9A to 9O, when the first instruction is the vector store instruction (VST1), the second instruction is the vector gather instruction (VGT1), the third instruction is the vector load instruction (VLD1), and the address region related to the vector store instruction (VST1) and the address region related to the vector load instruction (VLD1) do not overlap, the following vector load instruction (VLD1) can overtake the preceding vector gather instruction (VGT1) in the vector processing apparatus to which the instruction executing process (overtaking control) is not applied. However, the following vector load instruction (VLD1) cannot overtake the preceding vector store instruction (VST1). For this reason, in the vector processing apparatus to which the instruction executing process (overtaking control) in the first to fifth conventional examples is applied, the vector load instruction (VLD1) needs to wait for the fact that the vector store instruction (VST1) is sent to the instruction executing section 3.

As the operation of the vector processing apparatus of the present invention, the above-mentioned case (4) will be described below with reference to FIGS. 10A to 10V. In the case (4), it is supposed that the first instruction is the vector store instruction, the second instruction is the vector gather instruction, the third instruction is the vector store instruction, the fourth instruction is the vector gather instruction, and the fifth instruction is the vector load instruction. Here, the instruction issuing section 2 is supposed to transfer the vector store instruction (VST1), the vector gather instruction (VGT1), a vector store instruction (VST2), a vector gather instruction (VGT2) and the vector load instruction (VLD1) to the overtaking control circuit 1, in the order of the vector store instruction (VST1) as the first instruction, the vector gather instruction (VGT1) as the second instruction, the vector store instruction (VST2) as the third instruction, the vector gather instruction (VGT2) as the fourth instruction, and the vector load instruction (VLD1) as the fifth instruction. Also, it is supposed that the address region related to the vector store instruction (VST1), the address region related to the vector store instruction (VST2) and the address region related to the vector load instruction (VLD1) do not overlap.

Figure 10:
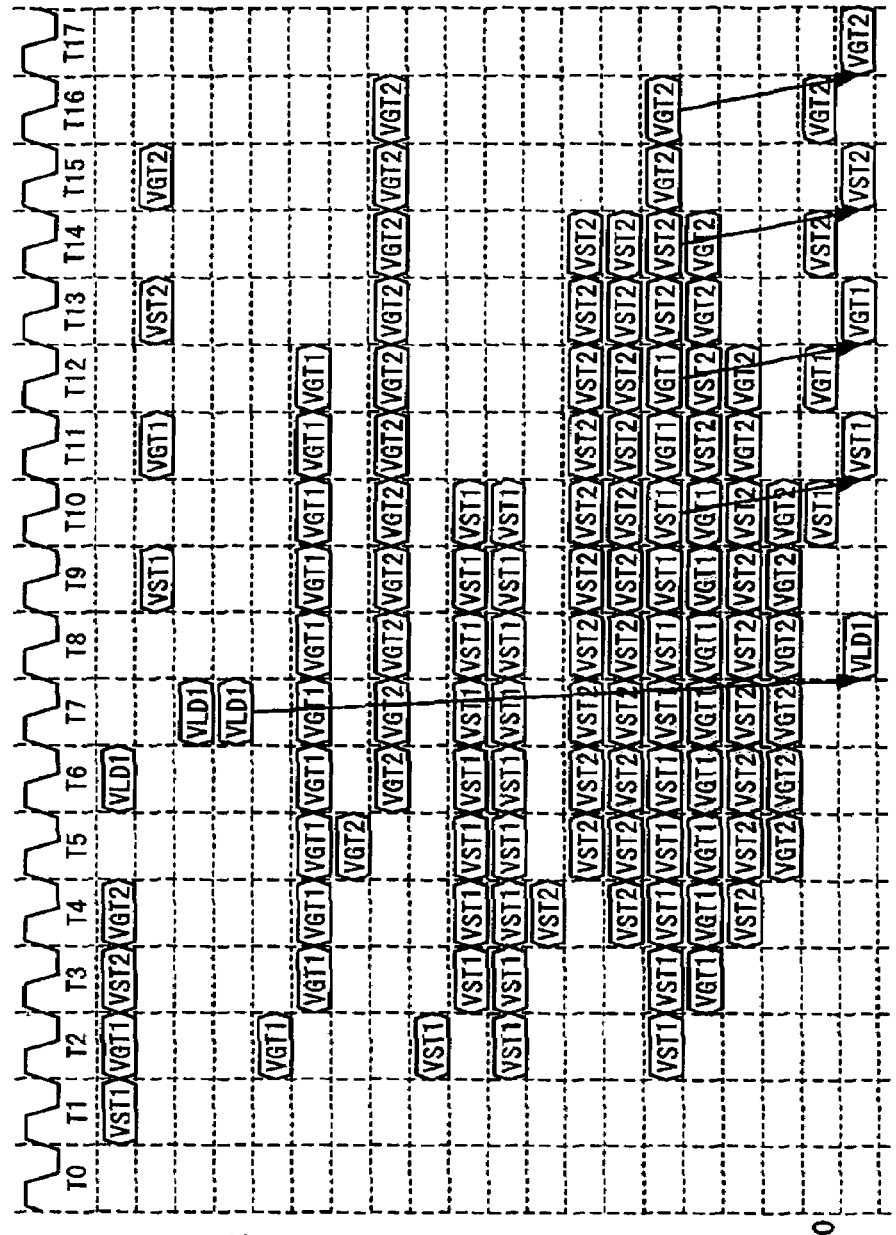
FIGS. 10A to 10V are timing charts showing an operation of the instruction executing process (overtaking control) in the vector processing apparatus of the present invention.

In this case, as shown in FIGS. 10A to 10V, in the vector processing apparatus to which the instruction executing process (overtaking control) in the present invention is applied, the following vector load instruction (VLD1) can overtake the preceding vector store instruction (VST1), vector gather instruction (VGT1), vector store instruction (VST2) sand vector gather instruction (VGT2). For this reason, in the vector processing apparatus to which the instruction executing process (overtaking control) in the present invention is applied, the vector load instruction (VLD1) does not need to wait for the fact that the vector store instruction (VST1), the vector gather instruction (VGT1), the vector store instruction (VST2) and the vector gather instruction (VGT2) are sent to the instruction executing section 3.

The vector processing apparatus of the present invention is designed in such a manner that the two pairs of vector gather instruction valid flags are defined and the two pairs of vector store instruction valid flags are provided, in the case (4). However, the vector gather instruction valid flag and the vector store instruction valid flag can be increased. In such a case, the number of instructions such as the vector store instruction and vector gather instruction as targets for the overtaking can be increased.

As understood from the above-mentioned description, in the instruction executing process (overtaking control) in the vector processing apparatus of the present invention, the vector load instruction can overtake any combination of the vector gather instruction and vector store instruction. Therefore, in the vector processing apparatus of the present invention, by executing the vector load instruction during the preparation time to execute the vector gather instruction and vector store instruction, the waiting time for the vector load instruction to be sent to the instruction executing section 3 can be reduce and the process time necessary for the memory access can be greatly improved. That is, according to the vector processing apparatus of the present invention, the memory access can be made faster than that of the conventional vector processing apparatus.

In the vector processing apparatus of the present invention, the control in which the vector load instruction overtakes the vector store instruction and the vector gather instruction is described in the embodiments. However, as another embodiment of the present invention, the additions of the two kinds of the instructions, which will be described below, to the vector load instruction that is the instruction to carry out the overtaking could be considered. The two kinds of the instructions to be added are referred to as an addition 1 and an addition 2.

The instruction in the addition 1 is a load-based instruction, and indicates an instruction that can specify an address region to be accessed (hereafter, referred to as a scalar load instruction). The instruction in the addition 2 is a store-based instruction, and indicates an instruction that the store data is stored and an address region to be accessed can be specified (hereafter, referred to as a scalar store instruction).

Figure 11:
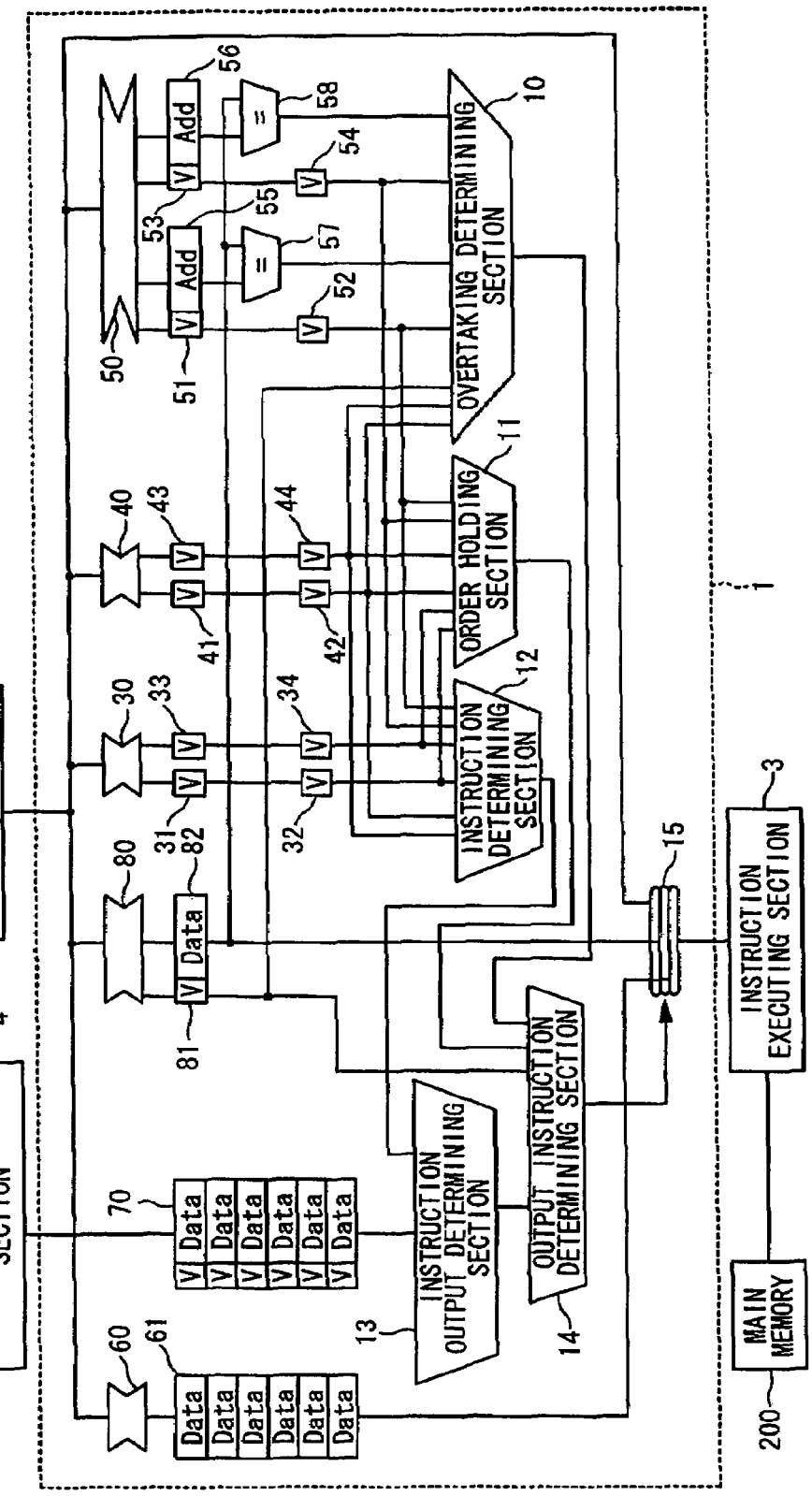
FIG. 11 is a block diagram showing another configuration in the vector processing apparatus of the present invention.

First, the addition 1 will be described. As the configuration of the vector processing apparatus according to another embodiment of the present invention, the configuration under the consideration of the addition 1 is shown in FIG. 11. The vector processing apparatus of the present invention shown in FIG. 11 is different from the vector processing apparatus shown in FIG. 1 in that the vector load instruction decoder 20 is replaced with a vector load/scalar load instruction decoder 80, the vector load instruction validation flag storage section 21 is replaced with a vector load/scalar load instruction valid flag storage section 81, and the vector load instruction register 22 is replaced with a vector load/scalar load instruction register 82. In the vector processing apparatus of the present invention shown in FIG. 11, the same reference numerals are assigned to the same components as the vector processing apparatus of the present invention shown in FIG. 1, and the descriptions thereof are omitted. Since the scalar load instruction is considered to be same as the vector load instruction accessing to the same region, the scalar load instruction is considered with regard to only the components related to the vector load instruction.

The vector load/scalar load instruction decoder 80 decodes a vector instruction sent from the instruction issuing section 2 to detect the vector load/scalar load instruction. When the vector instruction is the vector load/scalar load instruction, the vector load/scalar load instruction decoder 80 sets a vector load/scalar load instruction valid flag in the vector load/scalar load instruction valid flag storage section 81, and simultaneously stores the vector load/scalar load instruction as data in the vector load/scalar load instruction register 82.

The overtaking determining section 10 determines whether or not a following vector load/scalar load instruction can overtake the vector store instruction and the vector scatter instruction, based on the flags set in the vector load/scalar load instruction valid flag storage section 81, lower stage vector scatter instruction valid flag storage sections 42 and 44 and lower stage vector store instruction valid flag storage sections 52 and 54, and the determination results from the address region determining sections 57 and 58 (vector store instruction overtaking permission data/vector store instruction overtaking prohibition data) Then, the overtaking determining section 10 outputs the determination result (vector scatter instruction overtaking prohibition data, vector store instruction overtaking prohibition data and vector store instruction overtaking permission data).

The output instruction determining section 14 outputs the determination result, which indicates the vector instruction (vector load/scalar load instruction, vector gather instruction, vector store instruction, or vector scatter instruction) to be sent to the instruction executing section 3, to the output instruction selecting section 15, based on the determination result (vector scatter instruction overtaking prohibition data, vector store instruction overtaking prohibition data or vector store instruction overtaking permission data) from the overtaking determining section 10; the order data from the vector gather/store/scatter instruction order holding section 11; the determination result (vector gather instruction check data, vector store instruction check data or vector scatter instruction check data) from the vector gather/store/scatter instruction output determining section 13; and the vector load/scalar load instruction valid flag stored in the vector load/scalar load instruction valid flag storage section 81.

The output instruction selecting section 15 selects the vector load/scalar load instruction stored in the vector load/scalar load instruction register 82, or the vector instruction (vector gather instruction, vector store instruction or vector scatter instruction) from the vector gather/store/scatter instruction data storage section 61, in response to the determination result from the output instruction determining section 14. Then, the output instruction selecting section 15 sends as the output instruction to the instruction executing section 3.

Figure 12:
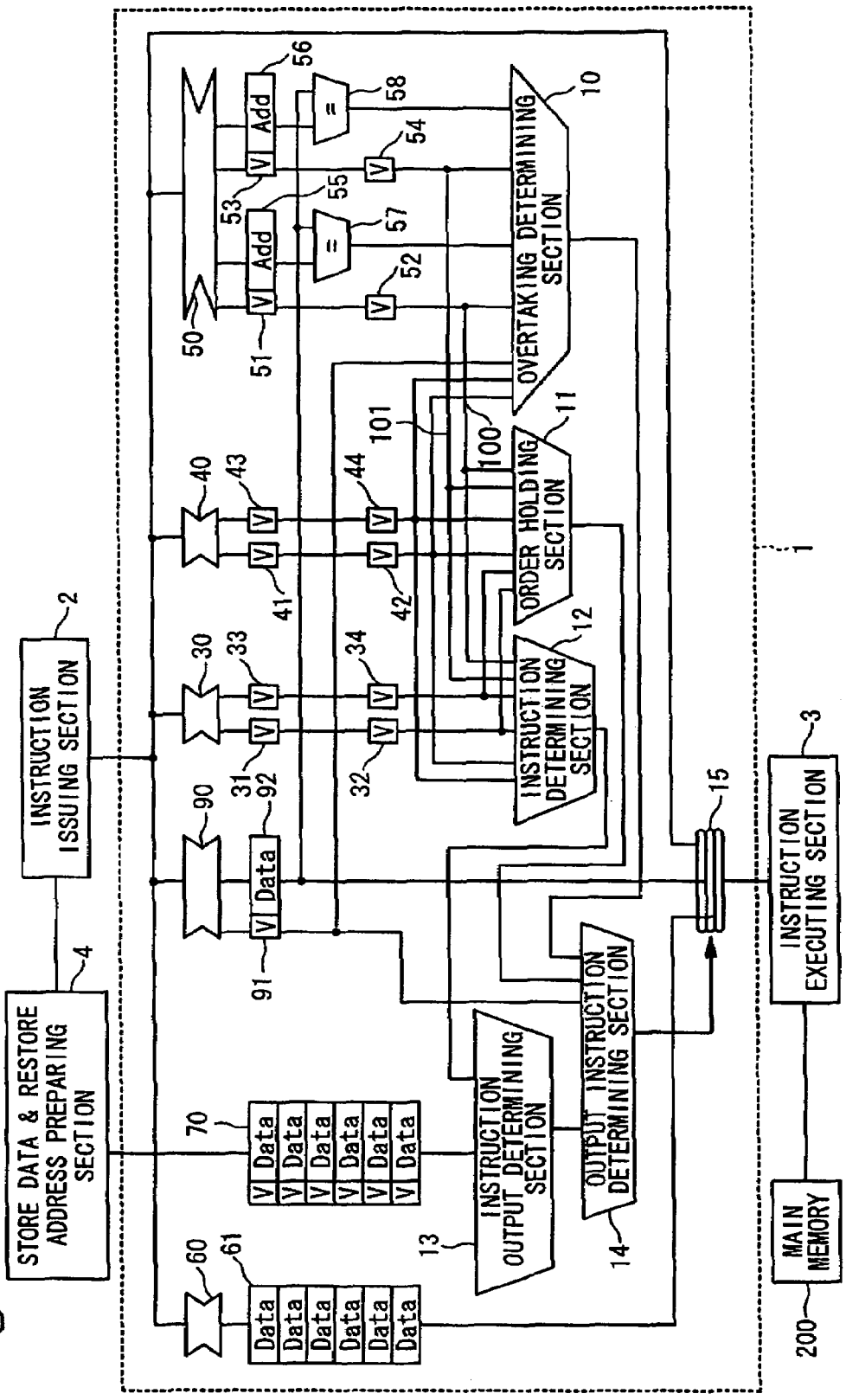
FIG. 12 is a block diagram showing still another configuration in the vector processing apparatus of the present invention.

Next, the addition 2 will be described. As the configuration of the vector processing apparatus according to another embodiment of the present invention, the configuration under the consideration of the addition 2 is shown in FIG. 12. The vector processing apparatus of the present invention shown in FIG. 12 is different from the vector processing apparatus of the present invention shown in FIG. 1 in that the vector load instruction decoder 20 is replaced with a vector load/scalar load/scalar store instruction decoder 90, the vector load instruction validation flag storage section 21 is replaced with a vector load/scalar load/scalar store instruction valid flag storage section 91, and the vector load instruction register 22 is replaced with a vector load/scalar load/scalar store instruction register 92.

In the vector processing apparatus of the present invention shown in FIG. 12, the same reference numerals are assigned to the same components as the vector processing apparatus of the present invention shown in FIG. 1, and the descriptions thereof are omitted.

Also, the scalar store instruction cannot overtake the vector gather instruction. For this reason, signal lines 100 and 101 are added to inform the existence of the vector gather instruction from the lower stage vector gather instruction valid flag storage sections 32 and 34 to the overtaking determining section 10. That is, the overtaking determining section 10 is further connected to the lower stage vector gather instruction valid flag storage sections 32 and 34.

When the vector gather instruction does not exist as the preceding instruction, the scalar store instruction can carry out the overtaking similarly to the vector load instruction. When the vector gather instruction exists as the preceding instruction, the scalar store instruction cannot carry out the overtaking until the vector gather instruction is sent to the instruction executing section 3.

The vector load/scalar load/scalar store instruction decoder 90 decodes the vector instruction sent from the instruction issuing section 2 to detect the vector load/scalar load/scalar store instruction. When the vector instruction is the vector load/scalar load/scalar store instruction, the vector load/scalar load/scalar store instruction decoder 90 sets a vector load/scalar load/scalar store instruction valid flag in the vector load/scalar load/scalar store instruction valid flag storage section 91. At the same time, the vector load/scalar load/scalar store instruction decoder 90 stores the vector load/scalar load/scalar store instruction in the vector load/scalar load/scalar store instruction register 92.

The overtaking determining section 10 determines whether or not a following vector load/scalar load/scalar store instruction can overtake the vector store instruction and the vector scatter instruction, based on the flags set in the vector load/scalar load/scalar store instruction valid flag storage section 91, lower stage vector scatter instruction valid flag storage sections 42 and 44 and lower stage vector store instruction valid flag storage sections 52 and 54, and the determination results from the address region determining sections 57 and 58 (vector store instruction overtaking permission data/vector store instruction overtaking prohibition data) Then, the overtaking determining section 10 outputs the determination result (vector scatter instruction overtaking prohibition data, vector store instruction overtaking prohibition data and vector store instruction overtaking permission data).

The output instruction determining section 14 outputs to the output instruction selecting section 15, the determination result, which indicates the vector instruction (vector load/scalar load/scalar store instruction, vector gather instruction, vector store instruction, or vector scatter instruction) to be sent to the instruction executing section 3 based on the determination result (vector scatter instruction overtaking prohibition data, vector store instruction overtaking prohibition data or vector store instruction overtaking permission data) from the overtaking determining section 10; the order data from the vector gather/store/scatter instruction order holding section 11; the determination result (vector gather instruction check data, vector store instruction check data or vector scatter instruction check data) from the vector gather/store/scatter instruction output determining section 13; and the vector load/scalar load/scalar store instruction valid flag stored in the vector load/scalar load/scalar store instruction valid flag storage section 91).

The output instruction selecting section 15 selects the vector load/scalar load/scalar store instruction stored in the vector load/scalar load/scalar store instruction register 92, or the vector instruction (vector gather instruction, vector store instruction or vector scatter instruction) from the vector gather/store/scatter instruction data storage section 61 in response to the determination result from the output instruction determining section 14. Then, the output instruction selecting section 15 sends as the output instruction to the instruction executing section 3.

In this way, in the vector processing apparatus of the present invention, the combination of the instructions, to which the overtaking control can be carried out can be widely established. Thus, the process time necessary for the memory access can be greatly improved in a larger number of combinations of the instructions, as compared with the conventional technique.

According to the vector processing apparatus and overtaking control circuit of the present invention, the following vector load instruction can overtake the vector store instruction and the vector gather instruction. Thus, the memory access can be made faster than that of the conventional vector processing apparatus.

What is claimed is:

1. A vector processing apparatus comprising:
   a main memory;
   an instruction issuing section configured to sequentially issue instructions, which contain instructions associated with access to said main memory;
   an overtaking control circuit, which performs overtaking control, configured to output said instructions received from said instruction issuing section to an instruction executing section in an order determined based on whether there are instructions belonging to a first specific instruction group before a last instruction, whether there are instructions belonging to a second specific instruction group in said first specific instruction group before said last instruction, whether there are instructions belonging to a third specific instruction group before said last instruction, whether said last instruction belongs to a fourth specific instruction group, and whether an address area of said main memory relating to said last instruction and an address area of said main memory relating to each of said instructions belonging to said second specific instruction group do not overlap at all,
   wherein the instruction executing section is configured to execute said instructions received from said overtaking control circuit in an order of reception,
   wherein the instructions belonging to the second specific instruction group are of a second type, the instructions belonging to the third specific instruction group are of a third type, and instructions belonging to the fourth specific instruction group are of a fourth type,
   wherein the second type, the third type, and the fourth type are different from each other,
   wherein the overtaking control circuit performs the overtaking control when an address region accessed by a vector store instruction preceding the last instruction does not overlap an address region accessed by the last instruction,
   wherein the last instruction is a vector load instruction,
   wherein the overtaking control circuit performs the overtaking control by outputting the vector load instruction to the instruction executing section before outputting the vector store instruction to the instruction executing section when the address region accessed by the vector store instruction does not overlap the address region accessed by the vector load instruction.

2. The vector processing apparatus according to claim 1, wherein said overtaking control circuit comprises:
   a first decoder configured to detect ones of said received instructions, which belong to said first specific instruction group but does not belong to said second specific instruction group;
   a second decoder configured to detect ones of said received instructions, which belong to said second specific instruction group;
   a third decoder configured to detect ones of said received instruction, which belong to said third specific instruction group; and
   a fourth decoder configured to detect ones of said received instructions which belong to said fourth specific instruction group.

3. The vector processing apparatus according to claim 2, wherein said overtaking control circuit further comprises:
   an order holding section configured to hold an order of reception of said received instructions; and
   an overtaking determining section configured to determine whether an address area of said main memory relating to said instruction decoded by said fourth decoder and an address area of said main memory relating to said instruction decoded by said second decoder do not overlap at all.

4. The vector processing apparatus according to claim 3, wherein when a first instruction is received and then a second instruction is received in order after said first instruction, said third decoder does not detect any third instruction belonging to said third specific instruction group from said received instructions, and said fourth decoder detects said last instruction as a fourth instruction after said second instruction, said overtaking control circuit outputs said fourth instruction before said first or second instruction, depending on whether each of said first and second instructions belongs to said first specific instruction group, whether each of said first and second instructions belongs to said second specific instruction group, and whether the address area of said main memory relating to said fourth instruction and the address area of said main memory relating to each of said first and second instructions do not overlap at all.

5. The vector processing apparatus according to claim 4, wherein said overtaking control circuit outputs said fourth instruction before said first and second instructions while keeping the order of said received instructions other than said fourth instruction, when said first decoder detects said first and second instructions.

6. The vector processing apparatus according to claim 4, wherein said overtaking control circuit outputs said fourth instruction before said first and second instructions while keeping the order of said received instructions other than said fourth instruction, when said first decoder detects said first instruction, and said second decoder detects said second instruction, and when the address area of said main memory relating to said fourth instruction and the address area of said main memory relating to said second instruction do not overlap at all, and
said overtaking control circuit outputs said fourth instruction after said second instruction while keeping the order of said received instructions other than said fourth instruction, when said first decoder detects said first instruction, and said second decoder detects said second instruction, and when the address area of said main memory relating to said fourth instruction and the address area of said main memory relating to said second instruction overlap partially or entirely.

7. The vector processing apparatus according to claim 4, wherein said overtaking control circuit outputs said fourth instruction before said first and second instructions while keeping the order of said received instructions other than said fourth instruction, when said first decoder detects said second instruction, and said second decoder detects said first instruction, and when the address area of said main memory relating to said fourth instruction and the address area of said main memory relating to said first instruction do not overlap at all, and
said overtaking control circuit outputs said fourth instruction after said first instruction and before said second instruction while keeping the order of said received instructions other than said fourth instruction, when said first decoder detects said second instruction, and said second decoder detects said first instruction, and when the address area of said main memory relating to said fourth instruction and an address area of said main memory relating to said first instruction overlap partially or entirely.

8. The vector processing apparatus according to claim 3, wherein when a first instruction is received and then a second instruction is received in order after said first instruction, said third decoder detects a third instruction from said received instructions after said first instruction and before said second instruction, said fourth decoder detects said last instruction as a fourth instruction from said received instructions after said second instruction, said overtaking control circuit outputs said fourth instruction after said third instruction, depending on whether said second instruction belongs to said first specific instruction group, whether said second instruction belongs to said second specific instruction group, and whether the address area of said main memory relating to said fourth instruction and the address area of said main memory relating to said second instruction do not overlap at all.

9. The vector processing apparatus according to claim 8, wherein said overtaking control circuit outputs said fourth instruction after said third instruction and before said second instruction while keeping the order of said received instructions other than said fourth instruction, when said first decoder detects said second instruction.

10. The vector processing apparatus according to claim 8, wherein said overtaking control circuit outputs said fourth instruction after said third instruction and before said second instruction while keeping the order of said received instructions other than said fourth instruction, when said second decoder detects said second instruction, and when the address area of said main memory relating to said fourth instruction and the address area of said main memory relating to said second instruction do not overlap at all, and
said overtaking control circuit outputs said fourth instruction after said second instruction while keeping the order of said received instructions other than said fourth instruction, when said second decoder detects said second instruction, and when the address area of said main memory relating to said fourth instruction and the address area of said main memory relating to said second instruction overlap partially or entirely.

11. The vector processing apparatus according to claim 3, wherein when a first instruction is received and then a second instruction is received in order after said first instruction, said third decoder detects a third instruction from said received instructions before said first instruction, and said fourth decoder detects said last instruction as a fourth instruction from said received instructions, said overtaking control circuit outputs said fourth instruction after said third instruction and before said first or second instruction, depending on whether said first decoder detects each of said first and second instructions, whether said second decoder detects each of said first and second instructions, and whether the address area of said main memory relating to said fourth instruction and the address area of said main memory relating to each of said first and second instructions do not overlap at all.

12. The vector processing apparatus according to claim 11, wherein said overtaking control circuit outputs said fourth instruction after said third instruction and before said first instruction while keeping the order of said received instructions other than said fourth instruction, when said first decoder detects said first and second instructions.

13. The vector processing apparatus according to claim 11, wherein said overtaking control circuit outputs said fourth instruction after said third instruction and before said first and second instructions while keeping the order of said received instructions other than said fourth instruction, when said first decoder detects said first instruction, and said second decoder detects said second instruction, and when the address area of said main memory relating to said fourth instruction and an address area of said main memory relating to said second instruction do not overlap at all, and
said overtaking control circuit outputs said fourth instruction after said second instruction while keeping the order of said received instructions other than said fourth instruction, when said first decoder detects said first instruction, and said second decoder detects said second instruction, and when the address area of said main memory relating to said fourth instruction and the address area of said main memory relating to said second instruction overlap partially or entirely.

14. The vector processing apparatus according to claim 11, wherein said overtaking control circuit outputs said fourth instruction after said third instruction and before said first instruction while keeping the order of said received instructions other than said fourth instruction, when said second decoder detects said first instruction, and said first decoder detects said second instruction, and when the address area of said main memory relating to said fourth instruction and the address area of said main memory relating to said first instruction do not overlap at all, and said overtaking control circuit outputs said fourth instruction after said first instruction and before said second instruction while keeping the order of said received instructions other than said fourth instruction, when said second decoder detects said first instruction, and said first decoder detects said second instruction, and when the address area of said main memory relating to said fourth instruction and an address area of said main memory relating to said first instruction overlap partially or entirely.

15. The vector processing apparatus according to claim 1, wherein said first specific instruction group contains a vector gather instruction and the vector store instruction, said second specific instruction group contains the vector store instruction, said third specific instruction group contains a vector scatter instruction, and said fourth specific instruction group contains the vector load instruction.

16. The vector processing apparatus according to claim 15, wherein said fourth specific instruction group contains a scalar load instruction and a scalar store instruction.

17. The vector processing apparatus according to claim 1, wherein the overtaking control circuit performs the overtaking control when an instruction preceding the last instruction is not a vector scatter instruction.

\* \* \* \* \*

UNITED STATES PATENT AND TRADEMARK OFFICE
CERTIFICATE OF CORRECTION

PATENT NO. : 7,526,629 B2 Page 1 of 1
APPLICATION NO. : 11/062561
DATED : April 28, 2009
INVENTOR(S) : Yasumasa Saida It is certified that error appears in the above-identified patent and that said Letters Patent is hereby corrected as shown below:

Column 3, lines 50, 52, 53, 60, 61, 64, 66, delete "scholar", insert -- scalar --

Column 4, lines 9, 11, 13, 17, 19, 21, 23, 24, 26, delete "scholar", insert -- scalar --

Signed and Sealed this

Twenty-fourth Day of November, 2009

David J. Kappos
*Director of the United States Patent and Trademark Office*